(12) United States Patent
Narang et al.

(10) Patent No.: US 11,260,883 B2
(45) Date of Patent: *Mar. 1, 2022

(54) METHOD AND SYSTEM FOR DATA-DRIVEN AND MODULAR DECISION MAKING AND TRAJECTORY GENERATION OF AN AUTONOMOUS AGENT

(71) Applicant: Gatik AI Inc., Palo Alto, CA (US)

(72) Inventors: Gautam Narang, Palo Alto, CA (US); Apeksha Kumavat, Palo Alto, CA (US); Arjun Narang, Palo Alto, CA (US); Kinh Tieu, Palo Alto, CA (US); Michael Smart, Palo Alto, CA (US); Marko Ilievski, Palo Alto, CA (US)

(73) Assignee: Gatik AI Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/333,518

(22) Filed: May 28, 2021

(65) Prior Publication Data
US 2021/0380132 A1   Dec. 9, 2021

Related U.S. Application Data

(63) Continuation of application No. 17/125,668, filed on Dec. 17, 2020, now Pat. No. 11,124,204.
(Continued)

(51) Int. Cl.
| | |
|---|---|
| *B60W 30/09* | (2012.01) |
| *B60W 60/00* | (2020.01) |
| *G05B 13/02* | (2006.01) |
| *G06N 3/04* | (2006.01) |
| *B60W 30/095* | (2012.01) |

(52) U.S. Cl.
CPC ........ *B60W 60/0011* (2020.02); *B60W 30/09* (2013.01); *B60W 30/0956* (2013.01); *G05B 13/027* (2013.01); *G06N 3/0454* (2013.01); *B60W 2420/52* (2013.01);
(Continued)

(58) Field of Classification Search
CPC ............ B60W 30/09; B60W 30/0956; B60W 60/0011; G05B 13/027; G06N 3/0454
See application file for complete search history.

(56) References Cited

U.S. PATENT DOCUMENTS

| | | | |
|---|---|---|---|
| 6,278,965 B1 | 8/2001 | Glass et al. | |
| 6,292,830 B1 | 9/2001 | Taylor et al. | |

(Continued)

OTHER PUBLICATIONS

International Search Report and Written Opinion for application No. PCT/US20/64058 dated Feb. 26, 2021.
(Continued)

*Primary Examiner* — Anshul Sood
(74) *Attorney, Agent, or Firm* — Jeffrey Schox; Caitlin Ploch

(57) ABSTRACT

A system for data-driven, modular decision making and trajectory generation includes a computing system. A method for data-driven, modular decision making and trajectory generation includes: receiving a set of inputs; selecting a learning module such as a deep decision network and/or a deep trajectory network from a set of learning modules; producing an output based on the learning module; repeating any or all of the above processes; and/or any other suitable processes. Additionally or alternatively, the method can include training any or all of the learning modules; validating one or more outputs; and/or any other suitable processes and/or combination of processes.

20 Claims, 12 Drawing Sheets

Related U.S. Application Data

(60) Provisional application No. 63/055,763, filed on Jul. 23, 2020, provisional application No. 63/035,401, filed on Jun. 5, 2020.

(52) U.S. Cl.
CPC ..... *B60W 2554/20* (2020.02); *B60W 2554/40* (2020.02); *B60W 2555/60* (2020.02); *B60W 2556/50* (2020.02)

(56) References Cited

U.S. PATENT DOCUMENTS

| | | | |
|---|---|---|---|
| 8,737,986 | B2 | 5/2014 | Rhoads et al. |
| 9,507,346 | B1 | 11/2016 | Levinson et al. |
| 10,106,153 | B1 | 10/2018 | Xiao et al. |
| 10,860,022 | B2 | 12/2020 | Korchev et al. |
| 2008/0312833 | A1 | 12/2008 | Greene et al. |
| 2010/0131148 | A1 | 5/2010 | Camhi et al. |
| 2015/0100530 | A1 | 4/2015 | Mnih et al. |
| 2018/0196439 | A1 | 7/2018 | Levinson et al. |
| 2018/0232585 | A1 | 8/2018 | Kim |
| 2018/0339709 | A1 | 11/2018 | Tiwari et al. |
| 2019/0033085 | A1 | 1/2019 | Ogale et al. |
| 2019/0084571 | A1 | 3/2019 | Zhu et al. |
| 2019/0145784 | A1 | 5/2019 | Ma et al. |
| 2019/0146508 | A1 | 5/2019 | Dean et al. |
| 2019/0147255 | A1 | 5/2019 | Homayounfar et al. |
| 2019/0315351 | A1 | 10/2019 | Smith et al. |
| 2019/0317496 | A1 | 10/2019 | Korchev et al. |
| 2019/0329763 | A1 | 10/2019 | Sierra Gonzalez et al. |
| 2019/0378019 | A1 | 12/2019 | Scheutz et al. |
| 2020/0033855 | A1 | 1/2020 | Jammalamadaka et al. |
| 2020/0033868 | A1 | 1/2020 | Palanisamy et al. |
| 2020/0086862 | A1 | 3/2020 | Cui et al. |
| 2020/0150672 | A1 | 5/2020 | Naghshvar et al. |
| 2020/0174472 | A1 | 6/2020 | Zhang et al. |
| 2020/0207339 | A1 | 7/2020 | Neil et al. |
| 2020/0302322 | A1 | 9/2020 | Tukiainen et al. |
| 2020/0356828 | A1 | 11/2020 | Palanisamy et al. |

OTHER PUBLICATIONS

International Search Report and Written Opinion for application No. PCT/US2020/065700 dated Mar. 24, 2021.

International Search Report and Written Opinion for application No. PCT/US2020/66181 dated Mar. 17, 2021.

"ApolloAuto/apollo Planning", GitHub, https://github.com/ApolloAuto/apollo/blob/master/modules/planning/README.md.

"Learning to Drive in a Day", https://www.youtube.com/watch?v=eRwTbRtnT1l, Jul. 2, 2018.

"Learning to Drive in a Day", Wayve, in research, Jun. 28, 2018, https://wayve.ai/blog/learning-to-drive-in-a-day-with-reinforcement-learning/.

Dabboussi, Abdallah, "Dependability approaches for mobile environment: Application on connected autonomous vehicles", Diss. University Bourgogne Franche-Comté, 2019, submitted Mar. 12, 2020.

Kendall, Alex, et al., "Learning to Drive in a Day", arXiv:1807.00412v2, 11. Sep. 2011.

Loquercio, Antonio, et al., "A General Framework for Uncertainty Estimation in Deep Learning", IEEE Robotics and Automation Letters PP(99):1-1, Feb. 2020.

Rastgoftar, Hossein, et al., "A Data-Driven Approach for Autonomous Motion Planning and Control in Off-Road Driving Scenarios", 2018 American Control Conference (ACC), IEEE, 2018, May 2018.

Schwarting, Wilko, et al., "Planning and Decision-Making for Autonomous Vehicles", Annual Review of Control, Robotics, and Autonomous Systems, Jan. 12, 2018, pp. 187-210.

Architecture of Safety confined Hybrid Trajectory Generator

METHOD AND SYSTEM FOR DATA-DRIVEN AND MODULAR DECISION MAKING AND TRAJECTORY GENERATION OF AN AUTONOMOUS AGENT

CROSS-REFERENCE TO RELATED APPLICATIONS

This application is a continuation of U.S. application Ser. No. 17/125,668, filed 17 Dec. 2020, which claims the benefit of U.S. Provisional Application No. 63/035,401, filed 5 Jun. 2020, and U.S. Provisional Application No. 63/055,763, filed 23 Jul. 2020, each of which is incorporated in its entirety by this reference.

TECHNICAL FIELD

This invention relates generally to the autonomous vehicle field, and more specifically to a new and useful system and method for data-driven, modular decision making and trajectory generation in the autonomous vehicle field.

BACKGROUND

Making safe and effective decisions in an autonomous vehicle is a complex and difficult task. This type of decision-making requires understanding of the current environment around the vehicle, an understanding of how this environment will evolve in the future, along with other factors involved in achieving safe and continuous progress towards the predefined driving goal. All decisions have to be continuously constrained by both driving rules of the road and human driving conventions, which is a difficult problem even for humans at times, and therefore an exceptionally challenging problem to implement with autonomous vehicles. Both the complicated nature of the driving interactions and the immense number of possible interactions makes decision-making and trajectory generation a tremendously difficult problem for autonomous systems. Regardless of the complexity, autonomous vehicles are tasked with solving this problem continuously; thus, a feasible solution which ensures scalability along with the safety of all road users is essential.

Conventional systems and methods have approached this problem in one of two ways—programmed or learned. Programmed motion planners produce a set of rules and constraints hand tuned and optimized by experts. Examples of this include conventional decision tree architectures employing data-driven models, which have only been utilized in restricted capacities such as perception. Conventional programmed approaches suffer from numerous limitations, such as, but not limited to: the production of unnatural decisions and motions (e.g., as shown in the programmed trajectory in FIG. 5); an exhaustive list of scenarios to program; and others. In contrast, learned motion planners involve analyzing large amounts of human driving data and/or running driving simulations. Examples of this include holistic end-to-end systems and single monolithic networks to address an entire driving policy module (e.g., mid-to-mid systems). Learned approaches also suffer from numerous limitations and drawbacks, such as, but not limited to: lack of safety assurances (e.g., as a result of treating the problem of motion planning in an end-to-end fashion, traditional learning algorithms are not able to provide safety assurances regarding the trajectories created by their networks); sample sparsity (e.g., the ability to capture all possible samples [driving scenarios] that the vehicle will be encountering in the real world); a lack of interpretability and/or explainability; and others.

Thus, there is a need in the autonomous vehicle field to create an improved and useful system and method for decision making and trajectory generation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
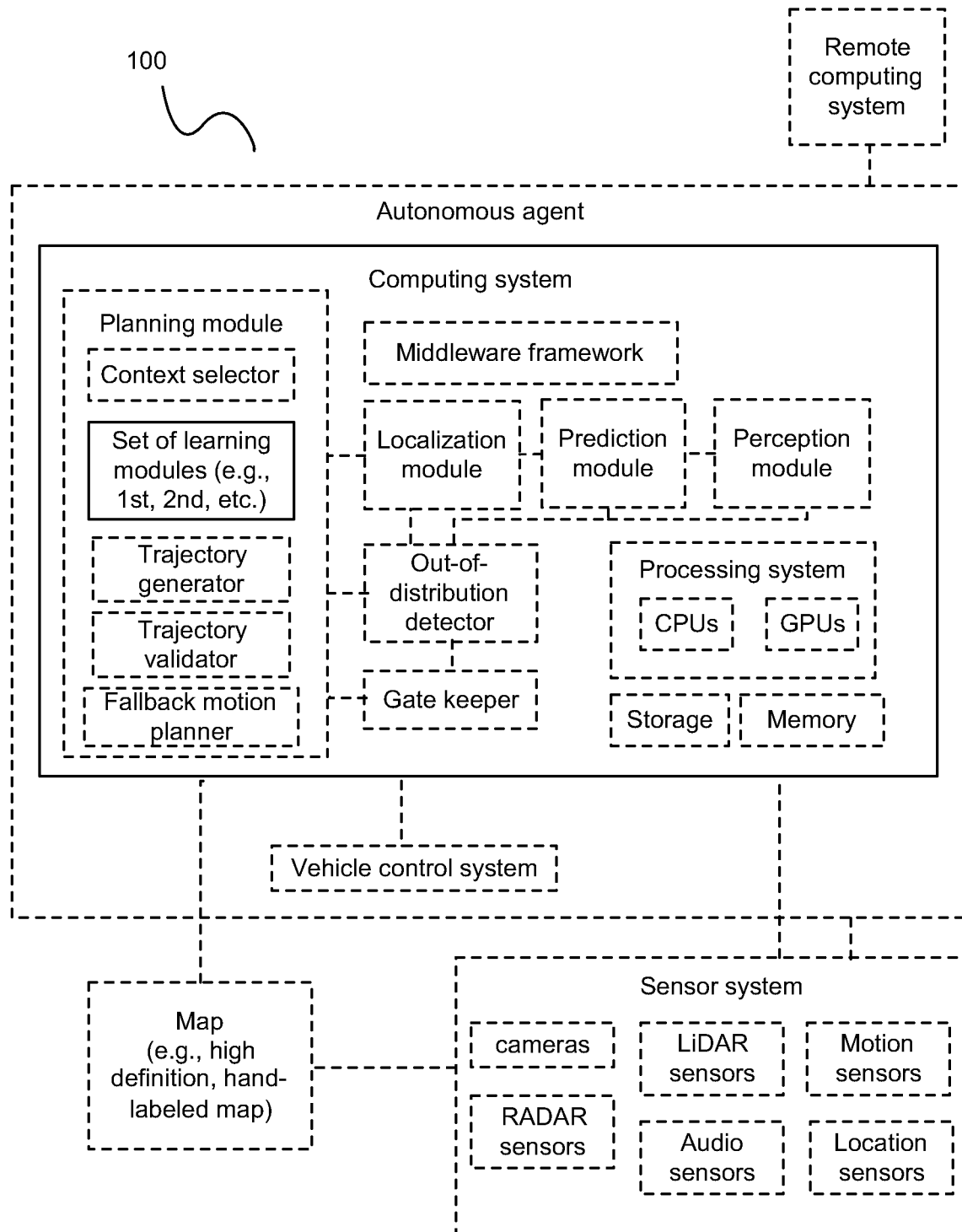
FIG. 1 is a schematic of a system for modular decision making and trajectory generation.

As shown in FIG. 1, a system 100 for data-driven, modular decision making and trajectory generation includes a computing system. Additionally or alternatively, the system can include and/or interface with any or all of: an autonomous agent (equivalently referred to herein as an autonomous vehicle and/or an ego vehicle); any number of modules of the autonomous agent (e.g., perception module, localization module, planning module, etc.); a vehicle control system; a sensor system; and/or any other suitable components or combination of components.

Additionally or alternatively, the system 100 can include and/or interface with any or all of the systems, components, embodiments, and/or examples described in U.S. application Ser. No. 17/116,810, filed 9 Dec. 2020, which is incorporated herein in its entirety by this reference.

Figure 2:
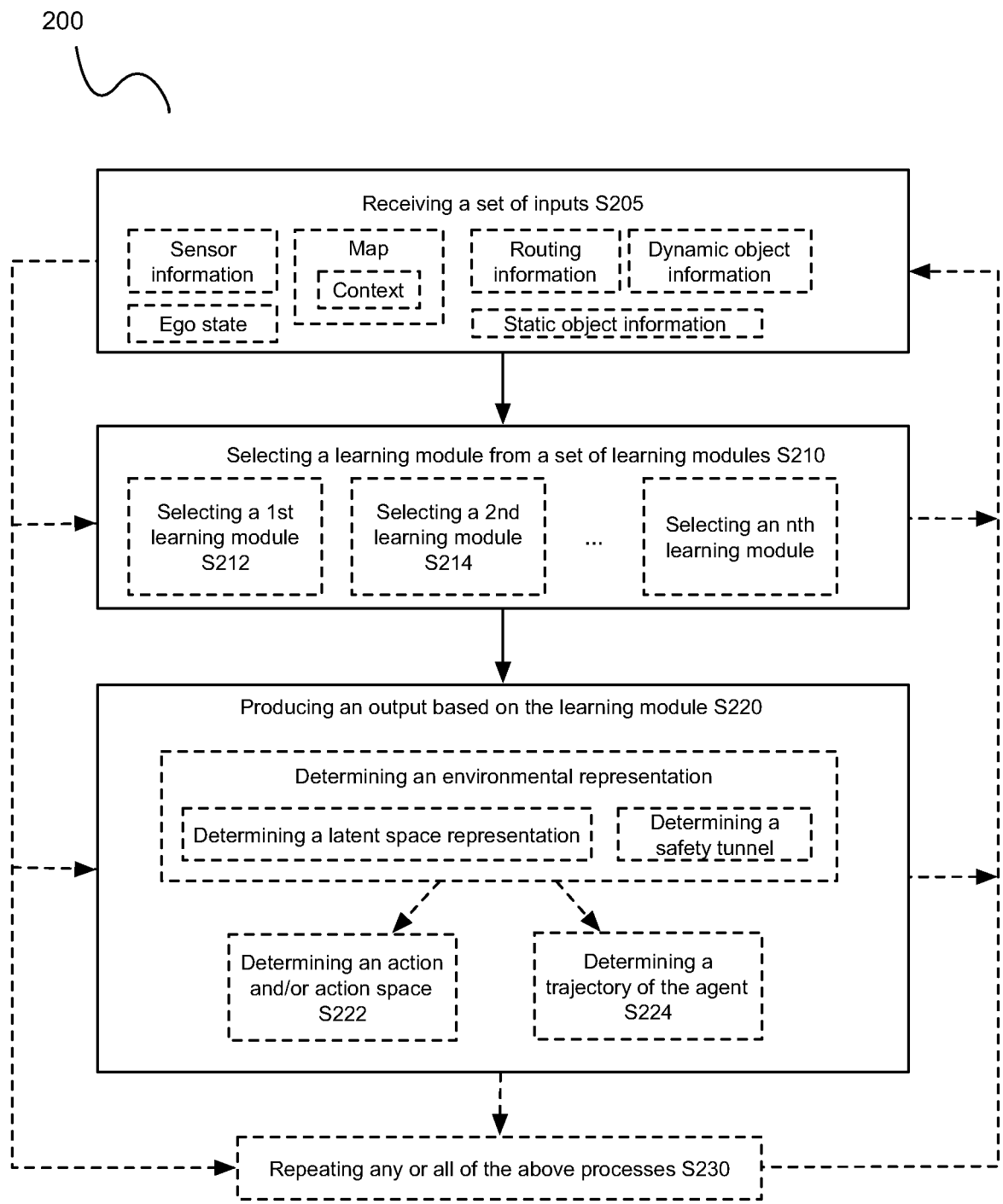
FIG. 2 is a schematic of a method for modular decision making and trajectory generation.

As shown in FIG. 2, a method 200 for data-driven, modular decision making and trajectory generation includes: receiving a set of inputs S205; selecting a learning module (equivalently referred to herein as a learned model, a trained model, and a machine learning model, a micro module, and/or any other suitable term) from a set of learning modules S210; producing an output based on the learning module S220; repeating any or all of the above processes S230; and/or any other suitable processes. Additionally or alternatively, the method 200 can include training any or all of the learning modules; validating one or more outputs; and/or any other suitable processes and/or combination of processes.

Additionally or alternatively, the method 200 can include and/or interface with any or all of the methods, processes, embodiments, and/or examples described in U.S. application Ser. No. 17/116,810, filed 9 Dec. 2020, which is incorporated herein in its entirety by this reference.

Figure 11:
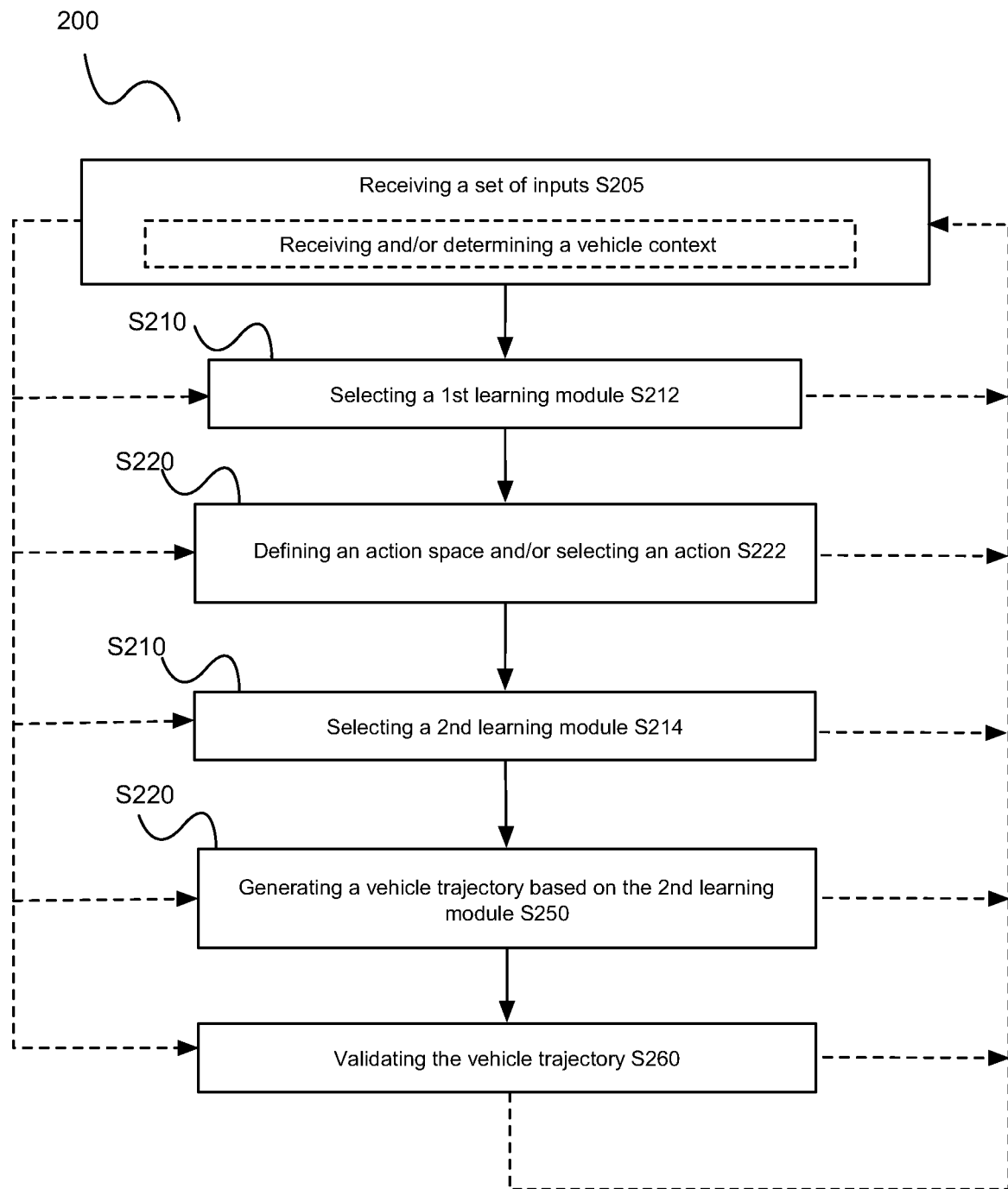
FIG. 11 is a schematic of a variation of the method 200.

In preferred variations of the method 200 as shown in FIG. 11, the method for data-driven, modular decision making and trajectory generation includes: receiving a set of inputs S205; as part of S210, selecting a $1^{st}$ learning module (equivalently referred to herein as a deep decision network) S212; as part of S220, defining an action space and/or selecting an action S222; as part of S210, selecting a $2^{nd}$ learning module (equivalently referred to herein as a deep trajectory network) based on the action S214; as part of S220, generating a vehicle trajectory based on the $2^{nd}$ learning module S224; and validating the vehicle trajectory S260. Additionally or alternatively, the method 200 can include any or all of: receiving and/or determining a vehicle context S205; determining a latent space representation S222; repeating any or all of the above processes S230; and/or any other suitable processes. Additionally or alternatively, the method 200 can include any other suitable processes.

The method 200 is preferably performed with a system 100 as described above, but can additionally or alternatively be performed with any other suitable system(s) for autonomous driving, semi-autonomous driving, and/or any other autonomous or partially autonomous system(s).

2. Benefits

The system and method for data-driven, modular decision making and trajectory generation can confer several benefits over current systems and methods.

In a first set of variations, the system and/or method confer the benefit of capturing the flexibility of machine learning (e.g., deep learning) approaches while ensuring safety and maintaining a level of interpretability and/or explainability. In specific examples, the system establishes and the method implements a hybrid architecture, which refers to an architecture including both programmed and learned portions (e.g., processes), which can have numerous advantages over and/or minimize the limitations of either of the individual approaches. In specific examples of the system and/or method, this approach and its advantages are enabled through a limited ODD and fixed route framework.

In a second set of variations, additional or alternative to those described above, the system and/or method confer the benefit of reducing an amount of data required to train each of a set of learning modules (e.g., $1^{st}$ and $2^{nd}$ learning modules). In specific examples a limited ODD and fixed route architecture enables the system and/or method to overfit the learning modules for fixed routes, which can subsequently enable any or all of: faster learning due to the reduced model scale and complexity of any or all of the learning modules; a need for exponentially less data to build a safe urban autonomy stack; a validation of the learning modules leading to guaranteed safety; a scalability of the system and/or method (e.g., for adding new routes); a minimizing and/or elimination of edge cases; and/or any other suitable benefits or outcomes.

In a third set of variations, additional or alternative to those described above, the system and/or method confers the benefit of utilizing an awareness of the vehicle's context to hypertune loss functions of the learning modules to these particular contexts when training them. This can subsequently function to increase an accuracy and confidence in scenario-specific events. In specific examples, training each of a set of decision making learning modules ($1^{st}$ set of learning modules) includes hypertuning a loss function to a particular context associated with the learning module in a 1:1 mapping.

In a fourth set of variations, additional or alternative to those described above, the system and/or method confers the benefit of maintaining explainability while generating naturalistic trajectories for the agent which accurately mirror human driving through the programmed selection of modular learning modules at the decision-making stage ($1^{st}$ set of learning modules) and at the trajectory generation stage ($2^{nd}$ set of learning modules).

In a fifth set of variations, additional or alternative to those described above, the system and/or method confers the benefit of enabling a data-driven approach to the modular decision making and trajectory generation.

In a sixth set of variations, additional or alternative to those described above, the system and/or method confers the benefit of improving the operation of one or more computing systems involved in decision making and trajectory generation, which can be enabled, for instance, through any or all of: the organization of the computing process and/or system into a modular architecture of smaller learning modules; reducing the information processed in trajectory generation by localizing the environment of the vehicle based on a selected action; hypertuning each of a $1^{st}$ set of micro learning modules to a particular context of the vehicle; hypertuning each of a $2^{nd}$ set of micro learning modules to a particular action of the vehicle; creating a centralized and parallel computing model which enables a high concurrency of task execution, low latency, and high throughput; and/or through creating any other suitable framework.

Additionally or alternatively, the system and method can confer any other benefit(s).

3. System

As shown in FIG. 1, the system 100 for data-driven, modular decision making and trajectory generation includes a computing system. Additionally or alternatively, the system can include and/or interface with any or all of: an autonomous agent (equivalently referred to herein as an autonomous vehicle and/or an ego vehicle); any number of modules of the autonomous agent (e.g., perception module, localization module, planning module, etc.); a vehicle control system; a sensor system; and/or any other suitable components or combination of components.

The system 100 functions to enable modular decision making and trajectory generation of an autonomous agent and includes: a computing system, wherein the computing system can include and/or implement a set of learning modules (e.g., $1^{st}$ set of learning modules, $2^{nd}$ set of learning modules, etc.) and optionally a trajectory generator, a trajectory validator, and/or any other suitable components and/or modules. Additionally or alternatively, the system can include and/or interface with any or all of: a localization module; a prediction module; a perception module; the autonomous agent (equivalently referred to herein as an autonomous vehicle and/or an ego vehicle); a vehicle control system; a sensor system; and/or any other suitable components or combination of components.

Figure 3A:
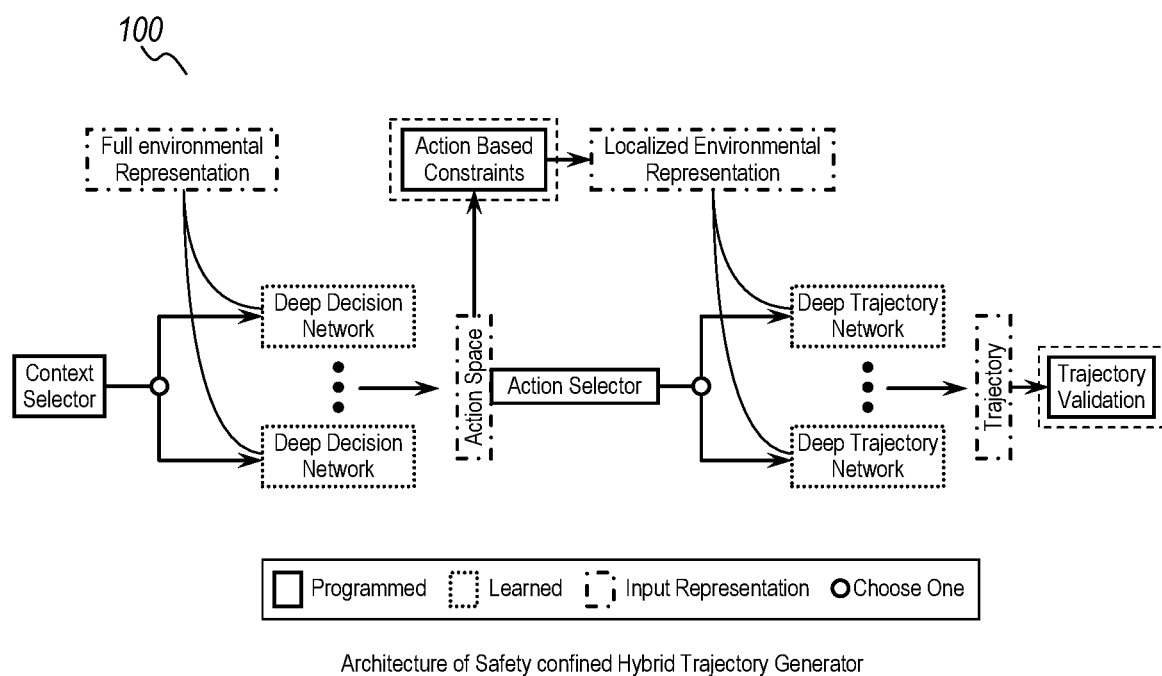
FIGS. 3A-3C depict a variation of a system for modular decision making, a variation of a deep decision network (set of 1st learning modules), and a variation of a deep trajectory network, respectively.
Figure 6:
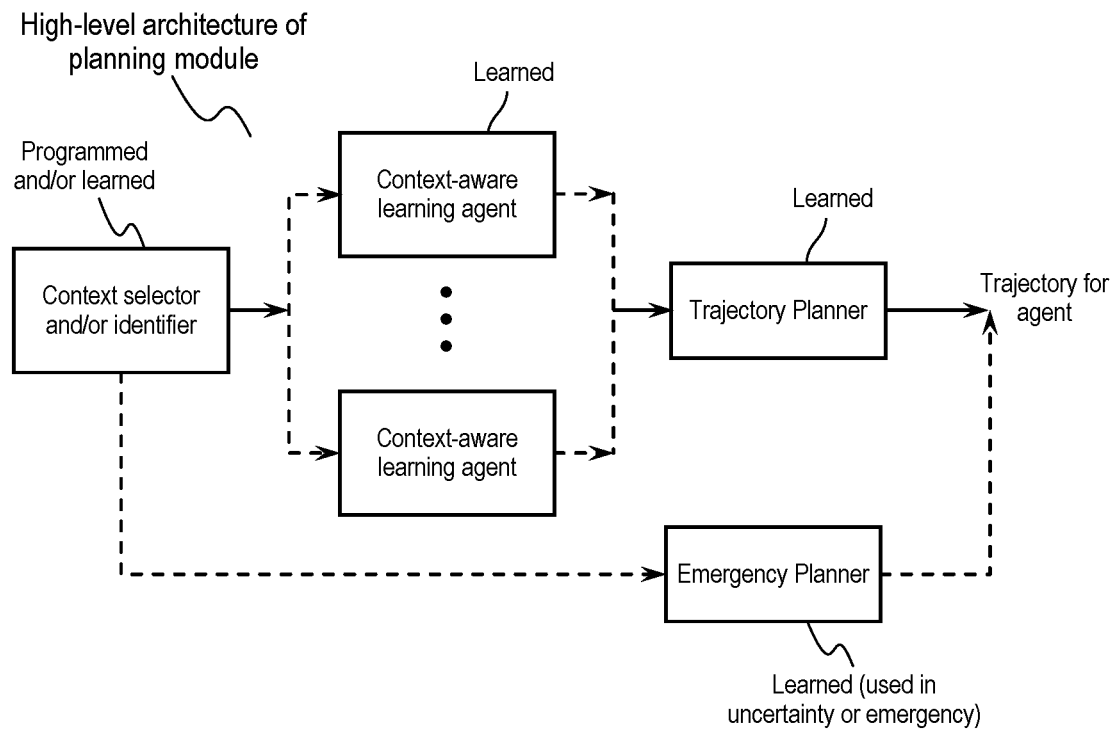
FIG. 6 depicts a variation of a high-level architecture of a planning module of the system 100.
Figure 7:
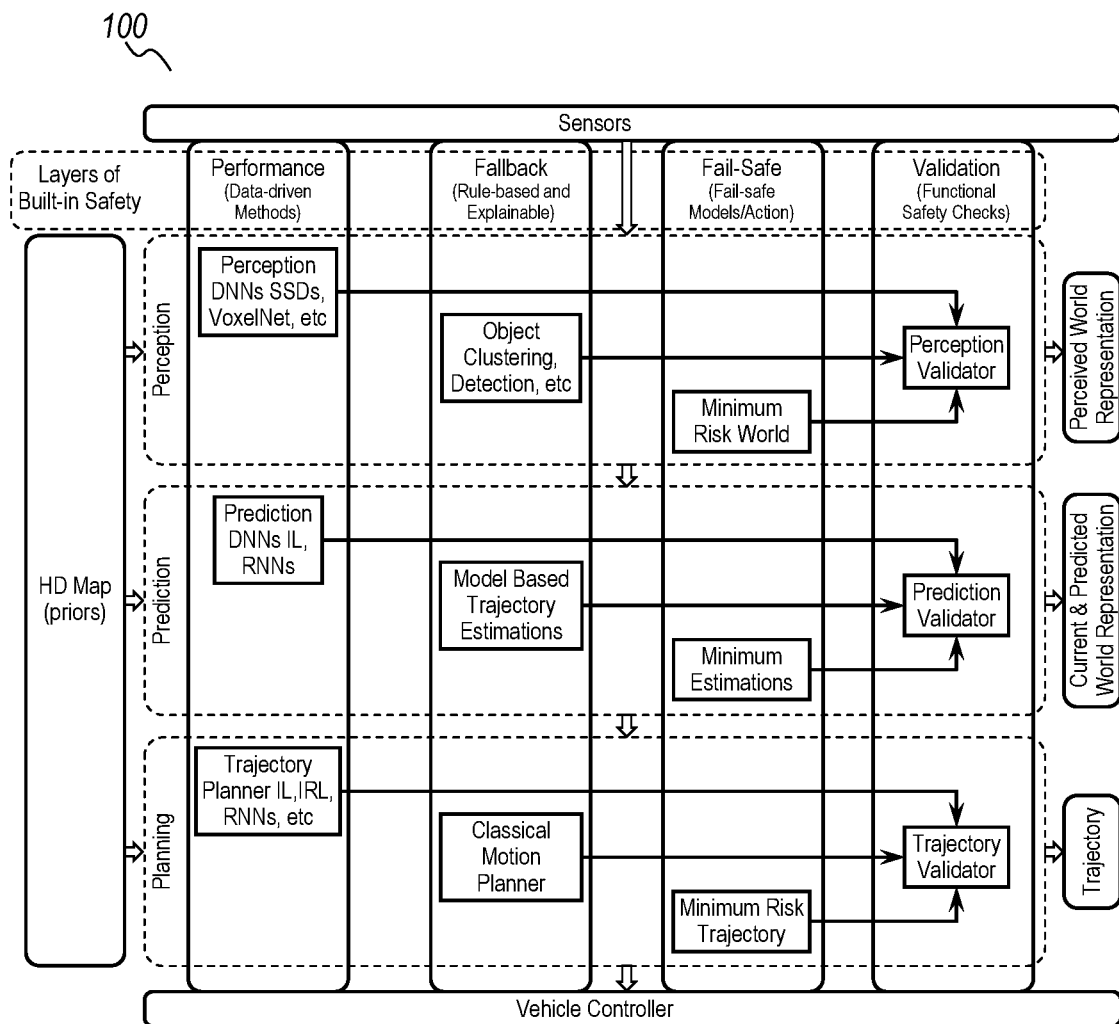
FIG. 7 depicts a schematic variation of an overall system of the autonomous agent.
Figure 8:
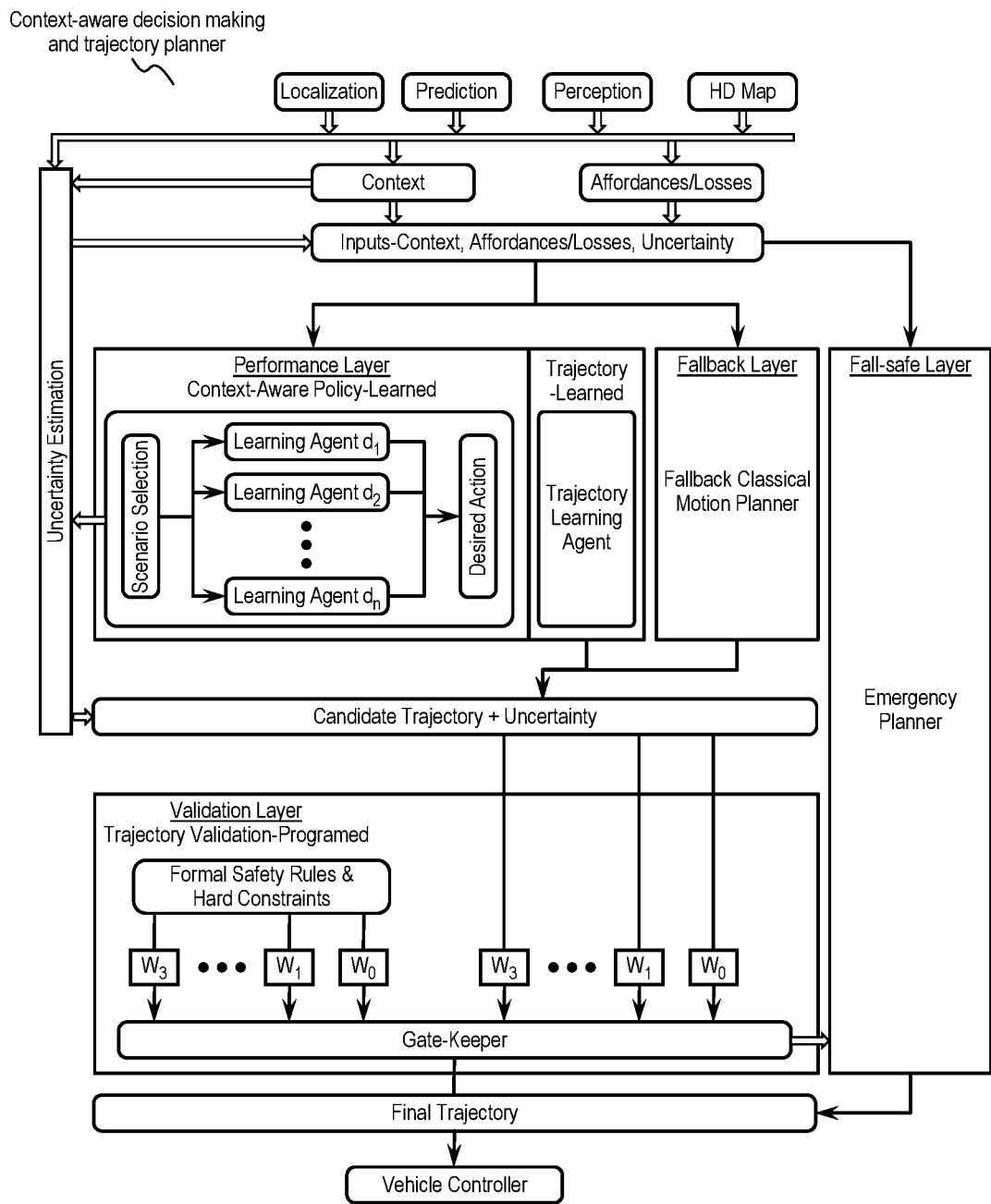
FIG. 8 depicts a schematic variation of context-aware decision making and trajectory planning.

The system 100 is preferably configured to implement and/or interface with a hybrid architecture of decision making and/or trajectory generation (e.g., as shown in FIG. 6, as shown in FIG. 7, as shown in FIG. 8, as shown in FIG. 3A, etc.), the hybrid architecture implementing both classical, rule-based approaches and machine learning approaches.

This is preferably enabled by a constrained and/or structured ODD (e.g., well-defined, specified, etc.) and fixed route driving framework (e.g., a non-geofenced driving framework), which functions to maintain explainability of the vehicle's decision making while enabling the vehicle to drive with human-like driving behavior on routes validated with minimal training data. Additionally or alternatively, the system 100 can be any or all of: configured to implement and/or interface with any suitable architecture configured to produce any suitable outputs at any part of autonomous vehicle operation (e.g., in planning, in motion planning, in trajectory planning, in perception, in localization, etc.); the autonomous agent can interface with any other driving framework (e.g., large ODD, non-fixed routes, geofenced, etc.); and/or the system 100 can be otherwise suitably configured.

In preferred variations, for instance, the system 100 defines a modular, hybrid architecture which is configured to implement both programmed and learned processes of the method 200. The system preferably functions to achieve the safety assurances and explainability/interpretability from programmed processes while maintaining the naturalistic and adaptive principles of learning processes. In preferred variations, the system 100 achieves this using a hybrid architecture which decomposes the task of motion planning and combines sets of micro-learning algorithms (which form and/or are integrated within the set of learning modules) sandwiched between a set of programmed safety constraints, wherein each of the learning modules' intended functionality is restricted to specific, explainable (and thus verifiable) tasks (e.g., based on a context and/or other environmental features of the vehicle). The system 100 can optionally implement and/or interface with (e.g., integrate with) a set of rule-based fallback and validation systems which are built around these learning modules to guarantee target safety and to ensure the safety of the resulting trajectory. With this architecture, a validation of the performance and underlying properties of each of these learning modules can be achieved, thereby enabling a much safer and more effective system to be built.

Figure 9A:
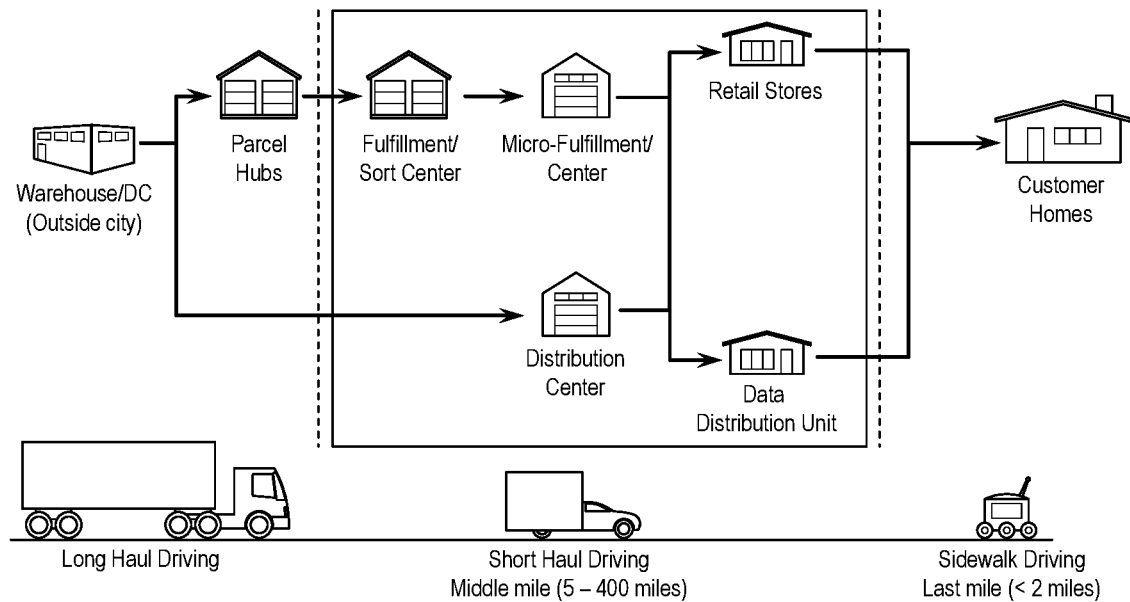
FIGS. 9A-9B depict a variation of a use case of an autonomous vehicle in fixed-route deliveries and a schematic of fixed routes driven by the vehicles.
Figure 9B:
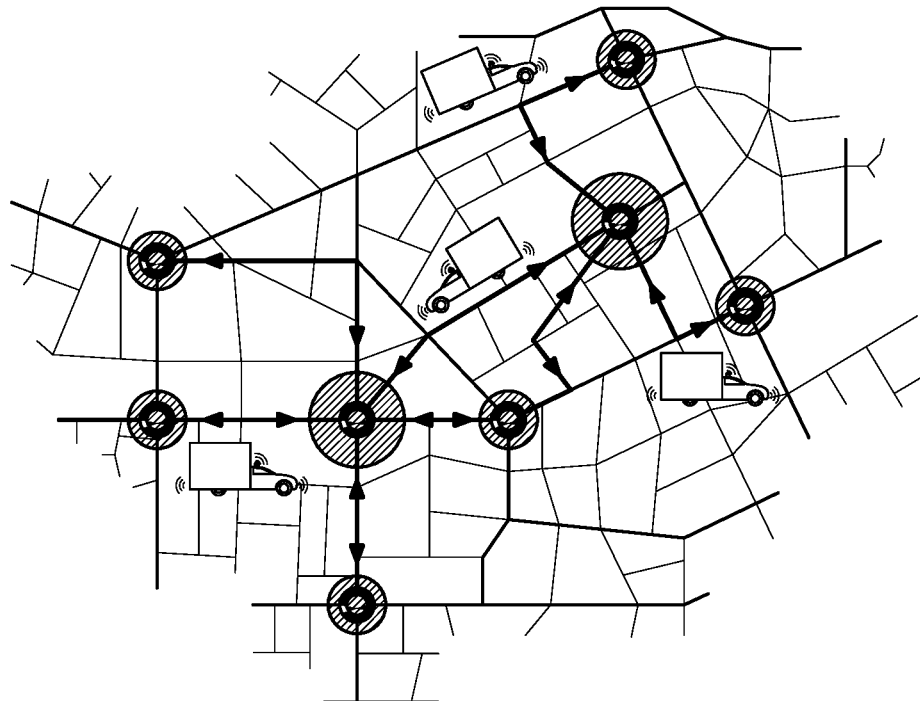

In specific examples (e.g., as shown in FIGS. 9A-9B), the system 100 is implemented in autonomous short-haul (e.g., between 5 and 400 miles) B2B fixed-route applications. In these variations, the autonomous agents preferably receive inventory from sorting centers, but can additionally or alternatively receive inventory for parcel hubs and/or warehouses. The agent then preferably delivers the inventory to and/or between any or all of: sorting centers, micro-fulfillment centers, distribution centers, retail stores, and local delivery centers. Additionally or alternatively, the agents can interface with residences (e.g., customer homes), and/or any other suitable locations/facilities.

Additionally or alternatively, the system 100 can be implemented in any other suitable way(s).

3.1 System—Components

The system 100 includes a computing system, which functions to enable modular decision making (e.g., motion planning) and/or trajectory generation of an autonomous agent. Additionally or alternatively, the computing system can function to perform any or all of: route planning of the vehicle at a planning module; validating a trajectory of the vehicle; localization of the vehicle and/or surrounding objects at a localization module; path prediction of the vehicle and/or objects surrounding the vehicle at a prediction module; storage of information; and/or any other suitable functions.

The computing system is preferably configured to implement centralized and parallel computing which enables any or all of: high concurrency of task execution, low latency, high data throughput, and/or any other suitable benefits. Additionally or alternatively, the computing system can be configured to perform any other computing and/or processing (e.g., decentralized computing, distributed computing, serial computing, etc.) and/or can confer any other suitable benefits.

Additionally or alternatively, the system and/or computing system can be otherwise configured and/or designed.

The computing system is preferably arranged at least partially onboard (e.g., integrated within) the autonomous agent.

In preferred variations, the autonomous agent includes an autonomous vehicle that is preferably a fully autonomous vehicle and/or able to be operated as a fully autonomous vehicle, but can additionally or alternatively be any semi-autonomous or fully autonomous vehicle, a teleoperated vehicle, and/or any other suitable vehicle. The autonomous vehicle is preferably an automobile (e.g., car, driverless car, bus, shuttle, taxi, ride-share vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The computing system can additionally or alternatively be arranged remote from the autonomous agent, such as a cloud computing system. The remote computing system is preferably in communication with the onboard computing system (e.g., to collect information from the onboard computing system, to provide updated models to the onboard computing system, etc.), but can additionally or alternatively be in communication with any other suitable components.

The computing system preferably includes active and redundant subsystems, but can additionally or alternatively include any other suitable subsystems.

The computing system preferably includes a planning module of the computing system, which further preferably includes any or all of: a set of learning modules (e.g., deep learning models); a trajectory generator; a trajectory validator; and/or any other suitable components. The set of learning modules preferably includes a set of deep decision networks (neural networks) which function to determine an action of the agent (based on context) and a set of deep trajectory networks (neural networks) which function to determine a trajectory for the agent (based on the action).

The computing system further preferably includes a processing system, which functions to process the inputs received at the computing system. The processing system preferably includes a set of central processing units (CPUs) and a set of graphical processing units (GPUs), but can additionally or alternatively include any other components or combination of components (e.g., processors, microprocessors, system-on-a-chip (SoC) components, etc.).

The computing system can optionally further include any or all of: memory, storage, and/or any other suitable components.

The computing system is further preferably configured to (e.g., able to, organized to, etc.) perform the computing associated with one or more modular sets of learning modules (equivalently referred to herein as learning agents or learning models), wherein each learning module includes a set of one or algorithms and/or models configured to produce a set of one or more outputs based a set of one or more inputs.

A single computing system can be used to do the computing for all of these modules, separate computing systems can be used (e.g., with an individual computing system for each learning module), and/or any combination of computing systems can be used.

The computing system can optionally include middleware framework, which extracts dependencies from modules and links them all together (e.g., with a topological ordering process such as a directed acylic graph, etc.).

In addition to the planning module, the computing system can include and/or interface with any or all of: a localization module, prediction module, perception module, and/or any other suitable modules for operation of the autonomous agent.

The computing system (e.g., onboard computing system) is preferably in communication with (e.g., in wireless communication with, in wired communication with, coupled to, physically coupled to, electrically coupled to, etc.) a vehicle control system, which functions to execute commands determined by the computing system.

The computing system can include and/or interface with a map, which functions to at least partially enable the determination of a context associated with the autonomous agent. The map is preferably a high definition, hand-labeled map as described below, which prescribes the context of the autonomous agent based on its location and/or position within the map, but can additionally or alternatively include any other map (e.g., automatically generated map) and/or combination of maps.

The system 100 preferably includes and/or interfaces with a sensor system, which functions to enable any or all of: a localization of the autonomous agent (e.g., within a map), a detection of surrounding objects (e.g., dynamic objects, static objects, etc.) of the autonomous agent, and/or any other suitable function.

The sensor system can include any or all of: cameras (e.g., 360-degree coverage cameras, ultra-high resolution cameras, etc.), light detection and ranging (LiDAR) sensors, radio detection and ranging (RADAR) sensors, motion sensors (e.g., accelerometers, gyroscopes, inertial measurement units [IMUs], speedometers, etc.), location sensors (e.g., Global Navigation Satellite System [GNSS] sensors, Inertial Navigation System [INS] sensors, Global Positioning System [GPS] sensors, any combination, etc.), ultrasonic sensors, and/or any suitable sensors.

In a set of variations, the sensor system includes: 16-beam LIDARs (e.g., for high fidelity obstacle detection, etc.); short range RADARs (e.g., for blind spot detection, cross traffic alert, emergency braking, etc.); ultrasonic sensors (e.g., for park assist, collision avoidance, etc.); 360-degree coverage cameras (e.g., for surround view for pedestrian/cyclist/urban obstacle detection and avoidance, etc.); 128-beam LIDAR (e.g., for localization of vehicle with high precision); long range ultra-high resolution cameras (e.g., for traffic sign and traffic light detection); long range RADARs (e.g., for long range obstacle tracking and avoidance); GNSS/INS (e.g., for ultra high precision localization); and/or any other suitable sensors.

In a first variation of the system 100, the system includes a computing system which includes the agent's planning module and includes and/or interfaces with the agent's perception and/or localization module(s), which includes the vehicle's sensor system(s).

Additionally or alternatively, the system 100 can include any other suitable components or combination of components.

4. Method

As shown in FIG. 2, a method 200 for data-driven, modular decision making and trajectory generation includes: receiving a set of inputs S205; selecting a learning module (equivalently referred to herein as a learned model, a trained model, and a machine learning model, a micro module, and/or any other suitable term) from a set of learning modules S210; producing an output based on the learning module S220; repeating any or all of the above processes S230; and/or any other suitable processes. Additionally or alternatively, the method 200 can include training any or all of the learning modules; validating one or more outputs; and/or any other suitable processes and/or combination of processes.

In preferred variations of the method 200 as shown in FIG. 11, the method for data-driven, modular decision making and trajectory generation includes: receiving a set of inputs S205; as part of S210, selecting a $1^{st}$ learning module S212; as part of S220, defining an action space and/or selecting an action S222; as part of S210, selecting a $2^{nd}$ learning module based on the action S214; as part of S220, generating a vehicle trajectory based on the $2^{nd}$ learning module S224; and validating the vehicle trajectory S260. Additionally or alternatively, the method 200 can include any or all of: receiving and/or determining a vehicle context S205; determining a latent space representation S222; and/or any other suitable processes. Additionally or alternatively, the method 200 can include any other suitable processes.

The method 200 preferably functions to perform decision making and trajectory generation of an autonomous agent, further preferably based on a context of the vehicle. Additionally or alternatively, the method 200 can function to perform only decision making, perform only trajectory generation, perform any part or process of vehicle planning (e.g., motion planning, path planning, maneuver planning, etc.), perform any other part or process of autonomous vehicle operation (e.g., perception, localization, etc.), select an action for the vehicle from an action space, validate a vehicle trajectory and/or any other output, and/or can perform any other suitable function(s).

The method 200 further preferably functions to perform decision making and trajectory generation (and/or any other suitable processes) with a modular framework of learning modules (e.g., $1^{st}$ set of learning modules, $2^{nd}$ set of learning modules, etc), wherein each of the learning modules is configured to process inputs associated with particular (e.g., predefined, predetermined, etc.) information (e.g., a particular vehicle context for the $1^{st}$ learning modules, a particular vehicle action for the $2^{nd}$ learning modules, etc.).

The method 200 further preferably functions to utilize programmed processes (e.g., selection of $1^{st}$ learning modules based on context, selection of $2^{nd}$ learning modules based on action, trajectory validation, etc.) along with the learned processes (e.g., machine learning models, deep learning models, neural networks, etc.) implemented by the learning modules, which functions to maintain an explainability and/or interpretability (e.g., relative to an end-to-end system, relative to a mid-to-mid system, etc.) of the outputs (e.g., actions, trajectories, etc.).

Additionally or alternatively, the method 200 can function to perform any or all of these processes independently of a context of the vehicle, in light of other information associated with the autonomous agent (e.g., historical information, dynamic information, vehicle state, etc.), within any other suitable framework, and/or the method 200 can be performed in any other suitable way(s) to perform any suitable function(s).

Additionally or alternatively, the method 200 can perform any other suitable function(s).

The method 200 is preferably performed throughout the operation of the autonomous agent, such as throughout the duration of the agent's traversal (e.g., according to a map which assigns a set of contexts) of a route (e.g., fixed route, dynamically determined route, etc.), but can additionally or alternatively be performed at any or all of: a predetermined frequency (e.g., constant frequency), in response to a trigger, at a set of intervals (e.g., random intervals), once, and/or at any other suitable times.

The method 200 is preferably performed with a system 100 as described above, further preferably with a computing system at least partially arranged onboard the autonomous agent, but can additionally or alternatively be performed with any suitable computing system and/or system.

4.1 Method—Receiving a Set of Inputs S205

The method 200 preferably includes receiving a set of inputs S205, which functions to receive information with which to select one or more learning modules (e.g., one of a $1^{st}$ set of learning modules, one of a $2^{nd}$ set of learning modules, etc.). Additionally or alternatively, S205 can function to receive information which serves as an input to one or more learning modules (e.g., input to a $1^{st}$ learning module, input to a $2^{nd}$ learning module, etc.), receive information with which to perform other processes of the method (e.g., determining one or more latent space representations, determining one or more environmental representations, etc.) and/or to trigger one or more processes, receive information with which to otherwise operate the agent (e.g., during perception, during localization, etc.), and/or can perform any other suitable function(s).

S205 is preferably performed throughout the method 200, such as any or all of: continuously, at a predetermined frequency, at random intervals, prior to each of a set of processes of the method 200, and/or at any other suitable times. S205 can additionally or alternatively be performed in response to a trigger (e.g., based on a map, in response to a context being selected, based on sensor information, etc.), at a set of intervals (e.g., random intervals), and/or at any other suitable time(s) during the method 200.

S205 is preferably performed with a system 100 as described above, further preferably with an onboard computing system and an onboard sensor system of the autonomous agent, but can additionally or alternatively be performed with any other components of the system and/or any other suitable systems.

The set of inputs preferably includes information received from a perception module of the autonomous agent, such as the sensor system, and/or determined (e.g., calculated) based on sensors in the sensor system (e.g., via a perception module), but can additionally or alternatively be received from any suitable sources (e.g., internet, autonomous agent, historical information, remote computing system, etc.).

The set of inputs can include any or all of: a current state of the agent (e.g., position, heading, pitch, acceleration, deceleration, etc.); information associated with a set of dynamic objects (e.g., current position, size, previous path, predicted path, etc.) such as those proximal to the agent; information associated with a set of static objects (e.g., traffic cones, mailboxes, etc.) such as those proximal to the agent (e.g., current state of static object, historical information associated with static object, etc.); a map and/or information from a map (e.g., HD map; hand-labeled map indicating a set of assigned contexts; automatically-labeled map indicating a set of assigned contexts; map indicating lane boundaries, connections between lane lines, positions of lanes, connectivity of lanes, semantic information, etc.; etc.); routing information required to reach a destination (e.g., ideal path to take, sequence of lanes to take, etc.); one or more uncertainty values and/or estimates (e.g., epistemic uncertainty, aleatoric uncertainty, etc.); autonomous agent state (equivalently referred to herein as the ego vehicle state); and/or any other suitable inputs.

In one set of variations, for instance, the set of inputs includes a high definition, labeled (e.g., hand-labeled, automatically-labeled, etc.) map which prescribes the context of the autonomous agent at any given time based on its location and/or orientation (e.g., pose) within the map, but can additionally or alternatively include any other map (e.g., map labeled in an automated fashion, map labeled through both manual and automated processes, etc.) and/or combination of maps. In additional or alternative variations, the map information includes any or all of: road infrastructure information and/or other static environment information, route information, and/or any other suitable information.

In specific examples, the map prescribes one or more contexts (and/or transition zones) selected based on (e.g., predetermined/assigned to) a region/location of the autonomous agent (e.g., as determined based on sensor information as described above).

The set of inputs preferably includes sensor information collected at a sensor system of the autonomous agent, such as any or all of: a sensor system onboard the autonomous agent, a sensor system remote from the autonomous agent, and/or a sensor system in communication with the autonomous agent and/or a computing system (e.g., onboard computing system, remote computing system, etc.) of the autonomous agent. Additionally or alternatively, the sensor information can be collected from any other suitable sensor(s) and/or combination of sensors, S205 can be performed in absence of collecting sensor inputs, and/or S205 can be performed in any other suitable way(s).

The sensor information can include and/or be used to determine location information associated with the autonomous agent, such as any or all of: position, orientation (e.g., heading angle), pose, geographical location (e.g., using global positioning system [GPS] coordinates, using other coordinates, etc.), location within a map, and/or any other suitable location information. In preferred variations, for instance, S205 includes receiving pose information from a localization module of the sensor subsystem, wherein the localization module includes any or all of: GPS sensors, IMUs, LIDAR sensors, cameras, and/or any other sensors (e.g., as described above). Additionally or alternatively, any other sensor information can be received from any suitable sensors.

The sensor information can additionally or alternatively include and/or be used to determine motion information and/or other dynamic information associated with the autonomous agent, such as, but not limited to, any or all of: velocity/speed, acceleration, and/or any other suitable information.

The sensor information can additionally or alternatively include and/or be used to determine (e.g., at a perception module) location information and/or motion information associated with one or more dynamic objects in an environment of the autonomous agent, such as any or all of the location information described above, location information relative to the autonomous agent, motion information of the dynamic objects, predicted information (e.g., predicted trajectory), historical information (e.g., historical trajectory), and/or any other suitable information. The dynamic objects can include, but are not limited to, any or all of: other vehicles (e.g., autonomous vehicles, non-autonomous vehicles, 4-wheeled vehicles, 2-wheeled vehicles such as bicycles, etc.), pedestrians (e.g., walking, running, rollerblading, skateboarding, etc.), animals, and/or any other moving objects (e.g., ball rolling across street, rolling shopping cart, etc.). Additionally or alternatively, the sensor information can include any other information associated with one or more dynamic objects, such as the size of the dynamic objects, an identification of the type of object, other suitable information, and/or the information collected in S205 can be collected in absence of dynamic object information.

The sensor information can additionally or alternatively include and/or be used to determine (e.g., at a perception module) location information and/or other information associated with one or more static objects (e.g., stationary pedestrians, road infrastructure, construction site and/or construction equipment, barricade(s), traffic cone(s), parked vehicles, etc.) in an environment of the autonomous agent, such as any or all of the information described above (e.g., identification of object type, etc.). Additionally or alternatively, the sensor information can include any other information associated with one or more static objects and/or the information collected in S205 can be collected in absence of static object information.

The set of inputs can include a vehicle context, which specifies an environment of the vehicle, and can function to characterize a driving context of the vehicle. The context is preferably prescribed based on a fixed route selected for the vehicle, and based on a map (e.g., high-definition, hand labeled map), such as a map as described above and/or any other suitable map(s). The context can additionally or alternatively be determined based on any or all of: sensor information from the sensor system such as the location of the agent, and/or any other suitable information.

In preferred variations, for instance, the contexts are assigned to locations and/or regions within the map. Each location and/or region in the map can be assigned any or all of: a single context; multiple contexts (e.g., indicating an intersection of multiple routes, wherein a single context is selected based on additional information such as any or all of the inputs received in S205, etc.); no context (e.g., indicating a location and/or region not on a fixed route option for the autonomous agent); and/or any combination of contexts. The particular context(s) assigned to the location and/or region are preferably determined based on the static environment at that location and/or within that region, such as any or all of: features of the roadway within that region (e.g., number of lanes, highway vs. residential road, one-way vs. two-way, dirt and/or gravel vs. asphalt, curvature, shoulder vs. no shoulder, etc.); landmarks and/or features within that region (e.g., parking lot, roundabout, etc.); a type of zone associated with that location and/or region (e.g., school zone, construction zone, hospital zone, residential zone, etc.); a type of dynamic objects encountered at the location and/or region (e.g., pedestrians, bicycles, vehicles, animals, etc.); traffic parameters associated with that location and/or region (e.g., speed limit, traffic sign types, height limits for semi trucks, etc.); and/or any other environmental information.

Additionally or alternatively, the assignment of contexts can take into account a set of fixed routes of the vehicle, wherein the map prescribes a sequential series of contexts which the vehicle encounters along the fixed route, wherein the vehicle's location within the map specifies which of these sequential contexts the vehicle is arranged within, and wherein the vehicle switches contexts proximal to (e.g., at) the transition between contexts.

In some variations, the map includes (e.g., assigns, prescribes, etc.) one or more transition zones which are arranged between different contexts, and can indicate, for instance, a change in context (e.g., along a fixed route, along a dynamically determined route, etc.), thereby enabling a switching of contexts to occur smoothly (e.g., by defining an action space. Assigning transition zones can function, for instance, to define an action space subsequently in the method which smoothly transitions the vehicle from one context to the next (e.g., preventing the availability of certain actions, prescribing that the agent maintain his or her lane, preventing a turn, etc.) and/or triggers any other process (e.g., the selection of a new $1^{st}$ learning module). The transition zones can be any or all of: overlapping with (e.g., partially overlapping with, fully overlapping with, etc.) one or more contexts; non-overlapping with one or more contexts; and/or any combination of overlapping and non-overlapping. Additionally or alternatively, the transition zones can be contexts themselves; the method can be performed in absence of labeled transition zones (e.g., by anticipating the subsequent context); and/or be otherwise performed.

Examples of contexts can include, but are not limited to, any or all of: a one-lane residential road (e.g., in which the agent cannot change contexts due to road geometry); a one-lane non-residential road; a multi-lane highway (e.g., in which the agent can learn it is less likely to see pedestrians); a single lane road in a parking lot; a single lane road with a yellow boundary on the side; a multi-lane fast moving road; regions connecting to roads (e.g., parking lot, driveway, etc.); and/or any other suitable contexts.

The vehicle context is preferably used in subsequent processes of the method, further preferably in the selection of a $1^{st}$ learning module (e.g., as described below), which simplifies and/or specifies the available actions to the autonomous agent. Additionally or alternatively, the context can be used to determine a scenario which is used in subsequent processes of the method, wherein the scenario functions to further specify the context, such as based on any or all of the information described above (e.g., speed limit, sensor information of objects surrounding vehicle, etc.). Examples of scenarios for a first context of (e.g., a two-way residential road) include, but are not limited to, any or all of: a right turn opportunity; an addition of a right turn lane; a stop sign; a traffic light; a yield sign; a crosswalk; a speed bump; and/or any other scenarios. Examples of scenarios for a second context (e.g., a multi-lane highway) include, but are not limited to, any or all of: lane changing; merging; overtaking a slow-moving vehicle; and/or any other scenarios. In some variations, for instance, the context triggers the selection of a model and/or algorithm (e.g., a highly-tuned, context-aware custom inverse reinforcement learning (IRL) algorithm), which makes high-level scenario selection and calls a scenario-specific learning module (e.g., a $1^{st}$ learning module as described below) to select an action of the vehicle. Additionally or alternatively, any other suitable algorithms or processes for selecting a scenario can be implemented, an action can be selected in absence of a scenario, a context can be used to select another parameter, and/or the method 200 can be otherwise performed.

Additionally or alternatively, the method 200 can include determining the vehicle context and/or scenario (e.g., from the map and sensor information, from sensor information alone, from other information, etc.) and/or otherwise using a vehicle context, scenario, and/or other information relevant to an environment of the vehicle.

Further additionally or alternatively, any other suitable inputs can be received in S205.

In a first set of variations, S205 includes receiving sensor information from a sensor system of the autonomous agent and a labeled map indicating a set of contexts assigned to a route (e.g., fixed route) and/or a potential route of the agent, wherein a context of the agent is determined based on the map and the sensor information. Any or all of the set of inputs (e.g., sensor information) are preferably received continuously throughout the method 200, but can additionally or alternatively be received at any other suitable times.

In a set of specific examples, the sensor information includes at least a location and/or orientation of the agent (e.g., a pose), information (e.g., location, orientation, motion, etc.) associated with dynamic and/or static objects in an environment of the agent, and optionally any other information, wherein the context of the agent is determined based on the location and/or orientation of the agent within the map.

In a second set of variations, additional or alternative to the first, S205 includes receiving sensor information from a sensor system of the autonomous agent and a context of the agent (e.g., a current context, an approaching context, etc.). The set of inputs are preferably received continuously throughout the method 200, but can additionally or alternatively be received at any other suitable times.

In a set of specific examples, the context is determined based on a map and a pose of agent, wherein the context is used subsequently in the method to select one of a $1^{st}$ set of learning modules.

4.2 Method—Selecting a Learning Module from a Set of Learning Modules S210

The method 200 includes selecting a learning module from a set of learning modules S210, which functions to select a specific (e.g., most relevant, optimal, specifically trained, etc.) learned model with which to determine a set of one or more outputs. S210 further preferably functions to utilize known (e.g., determined, selected, etc.) information associated with the agent (e.g., a selected context, a selected action, etc.) to increase the accuracy and/or confidence of the outputs of the learning modules. Additionally or alternatively, the learning modules can function to reduce and/or minimize the number of available outputs to choose from, based on this information, which can confer these above benefits and/or reduce computing/processing time, and/or perform any other suitable functions.

The selection of learning module is an informed selection of a learning module, further preferably a programmed and/or rule-based selection of which of the set of multiple learning modules to implement based on information known to the vehicle (e.g., context and/or scenario for selecting a $1^{st}$ set of learning modules, an action for selecting a $2^{nd}$ set of learning modules, any other environmental feature, sensor information, etc.) of the vehicle. Additionally or alternatively, learned processes and/or any other types of determination of a learning module can be implemented.

The learning module preferably includes one or more learned models and/or algorithms, further preferably a learned model and/or algorithm trained through one or more machine learning (e.g., deep learning) processes. In preferred variations, each of the learning modules includes one or more neural networks (e.g., deep learning network [DNN], deep Q-learning network, convolutional neural network [CNN]), but can additionally or alternatively include any other suitable models, algorithms, decision trees, lookup tables, and/or other tools.

S210 is preferably performed with a system 100 as described above, further preferably with an onboard computing system of the autonomous agent, but can additionally or alternatively be performed with any other components of the system 100 and/or any other suitable systems.

S210 can be performed once and/or multiple times throughout the method, such as any or all of: continuously, at a predetermined frequency, at a set of intervals (e.g., random intervals, etc.), in response to a change (e.g., predetermined change) in the set of inputs received in S205 (e.g., change in context), in response to an output produced by a prior learning module (e.g., selecting one of a $2^{nd}$ set of learning modules in response to an action and/or action space produced by a $1^{st}$ learning module), in response to any other suitable trigger(s), and/or at any other suitable times during the method 200.

S210 is preferably performed (e.g., partially performed, fully performed, etc.) in response to receiving inputs in S205, but can additionally or alternatively be performed at any other times and/or in response to any other suitable triggers.

In a preferred set of variations, S210 is performed multiple times throughout the method (e.g., from context selection to trajectory generation), such as described below in S212 and S214, which functions to increase the explainability and/or interpretability of the method 200 (e.g., in comparison to only performing S210 once). In variations in which one of a $1^{st}$ set of learning modules is used to determine an action and/or action space for the vehicle in light of the vehicle's context and one of a $2^{nd}$ set of learning modules is used to generate a trajectory for the agent based on the action and/or action space, each of these intermediate outputs maintains explainability and interpretability. Further, by having these highly focused micro modules, each of the modules can be trained to a highly tuned loss function specific to the environment (e.g., context) and/or actions of the agent. Additionally or alternatively, having multiple processes in which a learning module is selected can confer any other suitable benefits.

In an alternative set of variations, S210 is performed once during the method 200 (e.g., only S212, only S214, in a single learning module from context to trajectory generation, in a single learning module which effectively combines the learning modules of S212 and S214, etc.).

Additionally or alternatively, S210 can be performed any number of times and to produce any suitable outputs during the method 200.

4.3 Method—Selecting a $1^{st}$ Learning Module S212

S210 preferably includes selecting a $1^{st}$ learning module S212, which functions to select a learning module tuned to (e.g., trained based on, with a highly tuned loss function corresponding to) the particular environment of the agent, further preferably a context (and/or scenario) of the agent. In preferred variations, for instance, S212 functions to select a particular learned model (e.g., decision network) from a set of multiple learned models based on the particular context (e.g., as described above) of the vehicle. S212 can additionally or alternatively function to define an action space available to the agent, inform a trajectory of the agent as determined by a trajectory planner, select a learning module based on other environmental information relative to the agent, select a learning module based on other information relative to the agent (e.g. historical information, object information, etc.), eliminate available options to the agent (e.g., eliminate available actions), and/or can perform any other suitable functions.

Selecting a 1$^{st}$ learning module is equivalently described herein as selecting one of a 1$^{st}$ set of learning modules and/or selecting one of a set of 1$^{st}$ learning modules.

S212 is preferably performed in response to (e.g., after, based on, etc.) S205 (e.g., a most recent instance of S205), but can additionally or alternatively be performed as part of S214 and/or concurrently with S214, in absence of S214, multiple times throughout the method (e.g., in response to the context changing), and/or at any other time(s) during the method 200. Further additionally or alternatively, the method 200 can be performed in absence of S212.

In some variations, S212 is performed in response to a trigger indicating that a context of the vehicle (e.g., as determined based on its location on a map) has changed and/or is about to change. This trigger can be determined based on any or all of: a predicted and/or known time at which the context will change (e.g., based on the map and a fixed route, based on historical information, etc.); a predicted and/or known distance until a new context (e.g., based on the map and a fixed route, based on historical information, etc.); the location of the agent within a transition zone on the map; and/or any other suitable information. Additionally or alternatively, S212 can be performed based on other triggers, continuously and/or at a predetermined frequency, in absence of a trigger, and/or in any other ways (e.g., as described above).

A single learning module from a 1$^{st}$ set of learning modules is preferably selected based on a context of the vehicle and/or a scenario determined based on the context. Additionally or alternatively, the particular learning module can be determined and/or selected based on other information received in S205 and/or any other suitable information. Further additionally or alternatively, multiple learning modules from the 1$^{st}$ set of learning modules can be selected (e.g., to be processed in series, to be processed in parallel, etc.).

The learning module is further preferably selected based on a mapping between contexts and learning modules. In preferred variations, each context is associated with a single learning module of the 1$^{st}$ set of learning modules in a 1:1 mapping, wherein each context is only associated with a single 1$^{st}$ learning module and wherein each of the 1$^{st}$ learning modules is only associated with a single context. The mappings are preferably predetermined (e.g., programmed, rule-based, etc.), but can additionally or alternatively be dynamically determined. Additionally or alternatively, a single context can be associated with multiple learning modules, wherein one is selected (e.g., further based on the set of inputs) and/or the module outputs are aggregated; a module can be associated with multiple contexts; and/or any other association can be established between contexts and learning modules.

Additionally or alternatively, the learning module can be selected based on other information (e.g., to further narrow down the selection of a learning module).

The learning module is preferably in the form of and/or includes a machine learning model, further preferably in the form of one or more neural networks and/or models (e.g., deep Q-learning network, convolutional neural network [CNN], inverse reinforcement learning [IRL] model, reinforcement learning [RL] model, imitation learning [IL] model, etc.) trained for a particular context and/or contexts, but can additionally or alternatively include any other suitable models, algorithms, decision trees, lookup tables, and/or other tools.

In preferred variations, each of the learning modules is a deep learning network (DNN) (e.g., neural network), further preferably a deep Q-learning network trained using an Inverse Reinforcement learning technique and/or process, wherein the number of layers (e.g., hidden layers) of the neural network can vary for different contexts and/or actions (e.g., between 3-8 layers, 3 or less layers, 8 or more layers, between 2 and 10 layers, between 1 and 15 layers, etc.). Additionally or alternatively, any other suitable networks, algorithms, and/or models can be used in the learning module(s), such as, but not limited to, any or all of: policy gradient methods, finite state machines [FSMs], probabilistic methods (e.g., Partially Observable Markov Decision Process [POMDP]), imitation learning [IL], RL or variations of IRL, and/or any other suitable models and/or networks and/or algorithms. Each of the learning modules is preferably the same type of neural network (e.g., with different numbers of layers, different weights, etc.) and/or algorithm and/or model, but can alternatively be different (e.g., have different architectures, different neural network types, etc.).

Each of the learning modules is preferably trained based on data occurring within the particular context type or context types associated with the learning module and optionally additionally based on data occurring within one or more fixed routes which pass through the context and/or contain regions/paths which are identified as being that context. In some variations, for instance, a single learning module applies to a particular context type, wherein the single learning module is trained based on data from locations which satisfy that context. In other variations, a single learning module applies to a particular context within a particular route, wherein the single learning module is trained based on data associated with that particular context in the particular fixed route. Additionally or alternatively, the learning module(s) can be trained with any suitable data.

Each of the learning modules is further preferably trained with inverse reinforcement learning, which functions to determine a reward function and/or an optimal driving policy for each of the context-aware learning modules. The output of this training is further preferably a compact fully-connected network model that represents the reward function and an optimal policy for each learning module. Additionally or alternatively, the learning modules can be otherwise suitably trained (e.g., with reinforcement learning, etc.) and/or implemented.

In a first variation, S212 includes selecting a context-aware learning module (equivalently referred to herein as a context-aware learning agent) based on a determined context of the agent. In specific examples, a single context-aware learning module is assigned to each context. The context-aware learning module is preferably trained with an inverse reinforcement learning model, but can additionally or alternatively be otherwise trained (e.g., with supervised learning, with semi-supervised learning, with unsupervised learning, etc.).

In a second variation, S212 includes selecting from multiple context-aware learning models assigned to and/or available to a particular context, wherein the particular context-aware learning module is selected based on any or all of: machine learning, a decision tree, statistical methods, an algorithm, and/or with any other suitable tool(s).

Additionally or alternatively, any other suitable learning modules can be selected, used, and/or trained.

4.4. Method—Producing an Output Based on the Learning Module S220

The method 200 includes producing an output based on the learning module S220, which functions to produce information with which to perform decision making and/or trajectory generation of the autonomous agent. Additionally or alternatively, the output(s) can be used in any other process of operation of the autonomous agent.

In preferred variations, S220 includes defining an action space and/or selecting an action S222 and generating a trajectory S224, but can additionally or alternatively include one of S222 and S224, and/or any other suitable output(s).

4.4 Method—Defining an Action Space and/or Selecting an Action S222

The method 200 preferably includes defining an action space and/or selecting an action S222, which functions to define a set of actions (equivalently referred to herein as behaviors and/or maneuvers) available to the agent in light of the vehicle's context and/or environment. Additionally or alternatively, S222 can function to minimize a number of available actions to the agent as informed by the context, which functions to simplify the process (e.g., reduce the time, prevent selection of an incompatible action, etc.) required to select an action for the vehicle. In some variations, for instance, the extra information and restriction from the context type can reduce the amount of data that is needed to train the different learning modules and better tune the learning module to a specific context to increase accuracy and confidence. The method 200 can optionally additionally or alternatively include selecting an action from the action space, which functions to determine a next behavior (e.g., switching and/or transitioning to a different behavior than current behavior, maintaining a current behavior, etc.) of the vehicle.

S222 is preferably performed in response to (e.g., after, based on, etc.) S212, but can additionally or alternatively be performed in response to S210, as part of S212 and/or concurrently with S212, in absence of S212, in response to S205, multiple times throughout the method, and/or at any other time(s) during the method 200. Further additionally or alternatively, the method 200 can be performed in absence of S222 (e.g., in variations in which a single learning module is used to determine a trajectory based on context).

S222 preferably includes determining an action space of actions available to the vehicle based on the vehicle context and selecting an action from the action space, but can additionally or alternatively include determining one of these and/or determining any other suitable outputs.

S222 is preferably performed with the selected $1^{st}$ learning module described above, wherein an action space and/or action is produced as an output (e.g., intermediate output, final output, etc.) of the learning module; additionally or alternatively, the learning module can produce any other suitable outputs. In preferred variations, a determination of the context and processing with a learning module selected for this context allows the action space to be relatively small (e.g., relative to all available actions). In preferred variations, each of the $1^{st}$ learning modules includes a set of one or more neural networks and/or other models (e.g., trained using an IRL algorithm and/or process, trained using an RL algorithm and/or process, CNNs, RNNs, etc.), wherein any or all of the neural networks are used to determine an action for the vehicle.

S222 preferably receives a set of inputs, such as any or all of those described S205, which are received as inputs to the $1^{st}$ learning module, thereby enabling the learning module to select an optimal action. The set of inputs is preferably received from and/or determined based on one or more sensors of the sensor system, but can additionally or alternatively be received from any suitable sources. In preferred variations, the $1^{st}$ learning module receives as an input information associated with a set of detected dynamic objects surrounding the agent (e.g., including the object's current position, size, previous path, and predicted path into the future). Additionally or alternatively, the $1^{st}$ learning module can be designed to perform self-prediction of dynamic object motion, which can, for instance, simplify the learning process (e.g., in terms of time and/or data required). The set of inputs further preferably includes information associated with a set of static objects (e.g., current state of the static objects including location); a map (e.g., high-definition, hand labeled map specific a series of contexts along a fixed route of the agent); routing information required to reach the agent destination; the routing information required to reach the destination; the state of the agent; static and dynamic object information (along with their predicted future paths); and/or any other suitable information.

Figure 3B:
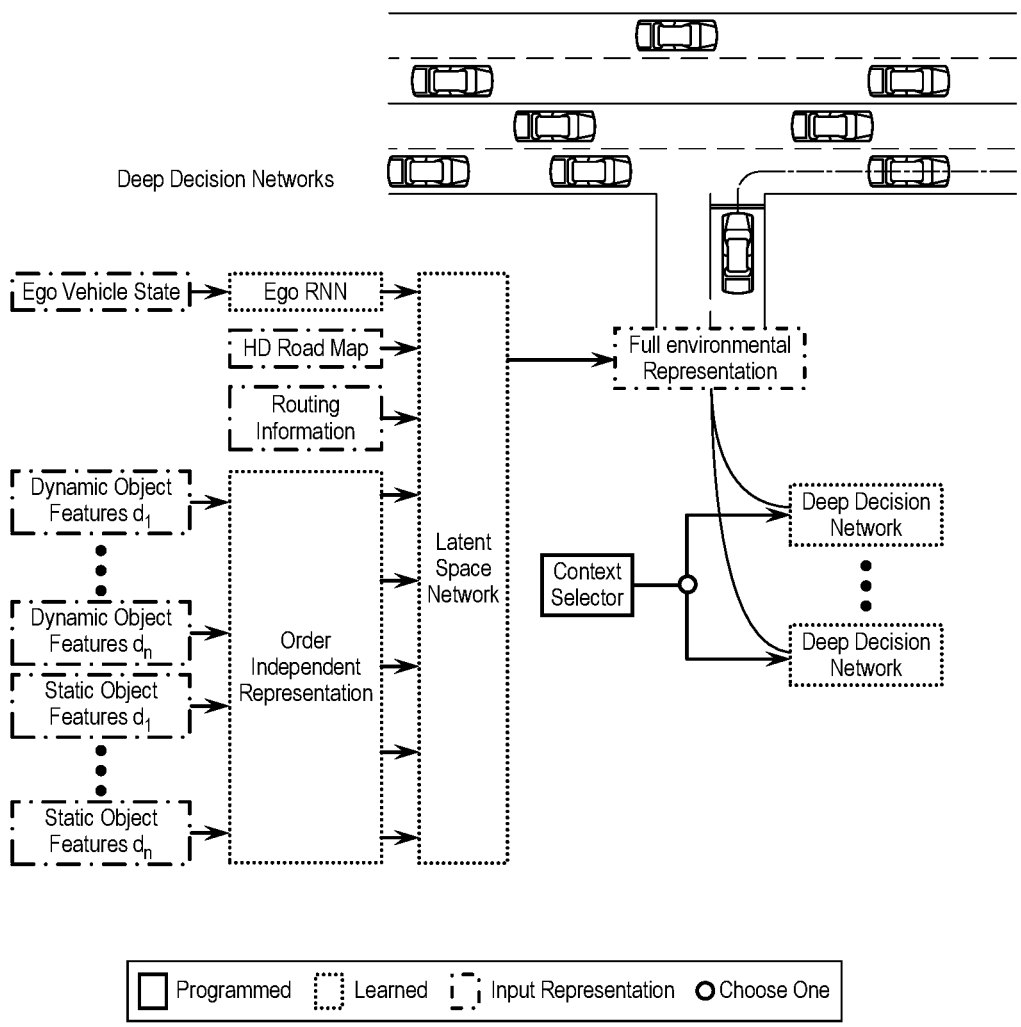

The selected $1^{st}$ learning module preferably receives as an input an environmental representation of the surroundings of the agent (e.g., as shown in FIG. 3B). This representation preferably includes not only information from the current time step but also from previous time steps, but can additionally or alternatively receive information associated with any suitable time(s).

Determining the environmental representation can optionally include determining a latent space representation based on any or all of the set of inputs, which functions to distill an extremely high order and complex amount of information into a smaller latent space representation prior to presenting an environmental representation as an input to the $1^{st}$ learning module. The latent space representation is preferably determined based on static and dynamic object information input into a first neural network (e.g., CNN) of the $1^{st}$ learning module, which produces as an output a more effective latent space representation, granting order invariance for the inputs of the objects. These inputs can then be combined with other inputs (e.g., HD map, routing information, and vehicle state) into a second neural network (e.g., CNN, neural network different than the $1^{st}$ neural network, same neural network as the $1^{st}$ neural network, etc.) that represents the entire input space as the most effective latent space representation. Additionally or alternatively, the latent space representation can be otherwise determined and/or S222 can be performed in absence of a latent space representation.

Figure 3C:
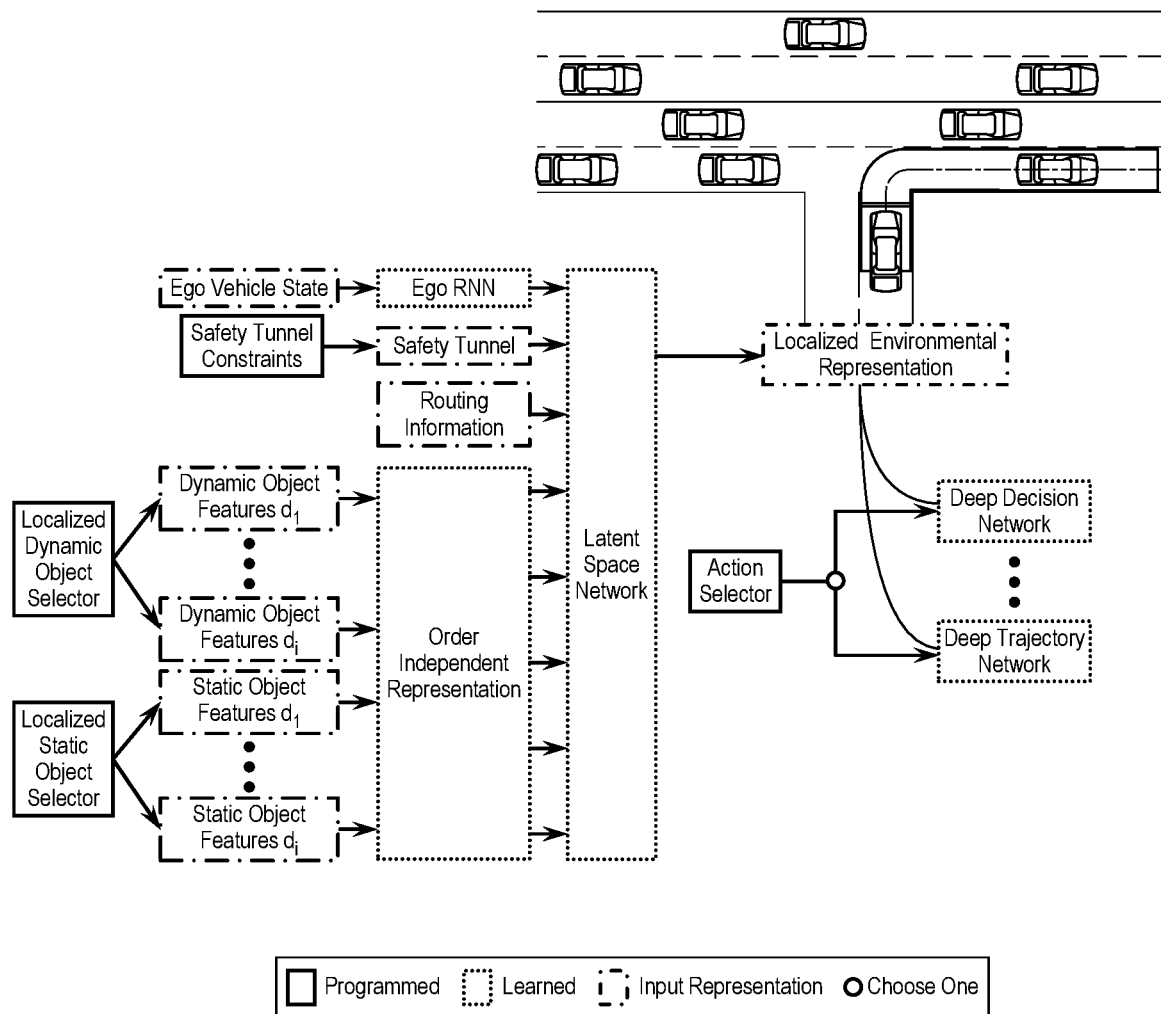

In specific examples (e.g., as shown in FIG. 3C), the learning agent takes as the following information: the set of detected dynamic objects including their current position, size, previous path, and predicted path into the future; the set of all static objects and their current states; a map (e.g., a high-definition map, a high-definition hand-labeled map, etc.); routing information required to reach the destination; the current ego state; and/or any other suitable information. A first neural network (e.g., an order independent representation recurrent neural network [RNN], a CNN, etc.) is used to output a more effective intermediate latent space representation which grants order invariance for the object inputs. This data is then combined along with the map, routing information, and vehicle state and fed into the latent space network which represents the entire input space as the most effective latent space representation. Additionally or alternatively, any or all of this information can be received in absence of a latent space representation and/or a different latent space representation, the latent space representation can include any number of neural networks and/or intermediate neural networks, the latent space representation can be determined in absence of an intermediate network, any other information can be received, any or all of this information can be determined by the learning module (e.g., the predicted path of dynamic objects), and/or S222 can be otherwise suitably performed.

The method 200 can optionally include training any or all of the 1$^{st}$ set of learning modules. The learning modules are preferably trained at a remote computing system of the system 100, but can additionally or alternatively be trained at any suitable location(s). Each module is preferably trained based on the full environmental representation as presented above as input and the correct action at every planning cycle. The training process preferably includes two phases, wherein the 1$^{st}$ phase functions to train the latent space representation networks, which can be implemented using a single temporary deep network responsible for classifying all driving actions regardless of the current context. In order to achieve this, this training is done on a complete set of data available in the data set. The 2$^{nd}$ phase uses the latent space representation learned in the 1$^{st}$ phase to train the deep networks to work on a specific context or action. This can be accomplished by fixing the weights of the latent space network (e.g., stopping all training for the network), the weights determined based on a loss function (e.g., a hyper-optimized loss function for a context, a hyper-optimized loss function for an action, etc.), thereby removing the temporary deep network, and creating the full set of networks which will be used to make the final decision. Each of the deep networks is preferably trained on the subset of the data within the context that it is configured to classify.

Additionally or alternatively, the 1$^{st}$ learning modules can be otherwise configured and/or trained (e.g., with supervised learning, with semi-supervised learning, with unsupervised learning, etc.).

Figure 4:
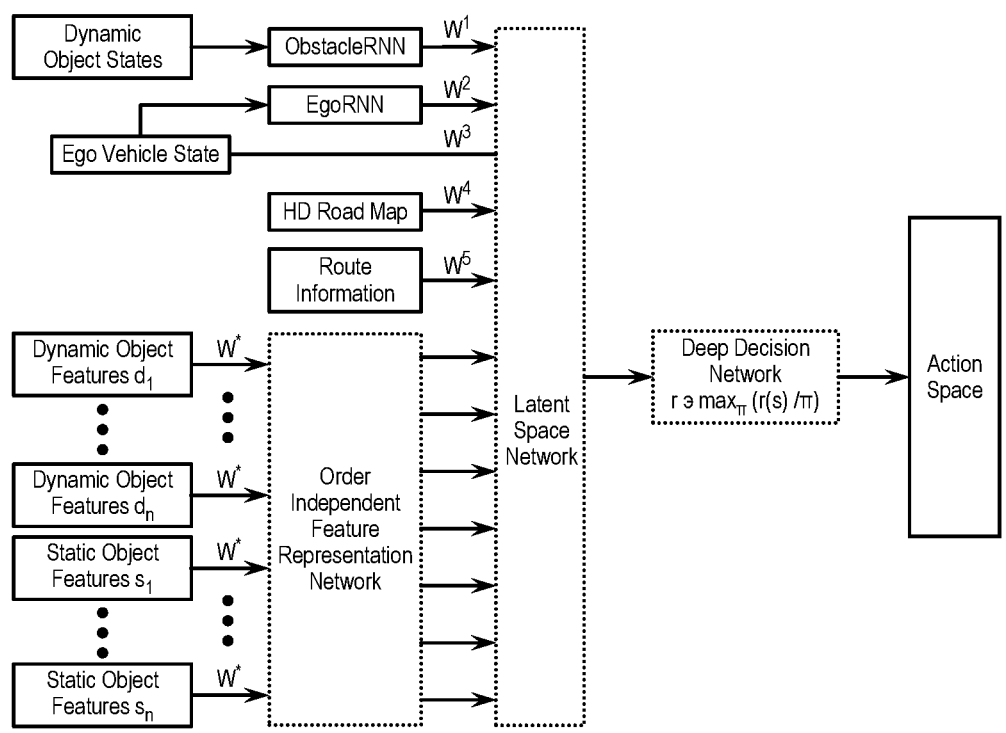
FIG. 4 depicts a variation of a deep decision network (set of 1st learning modules).
Figure 5:
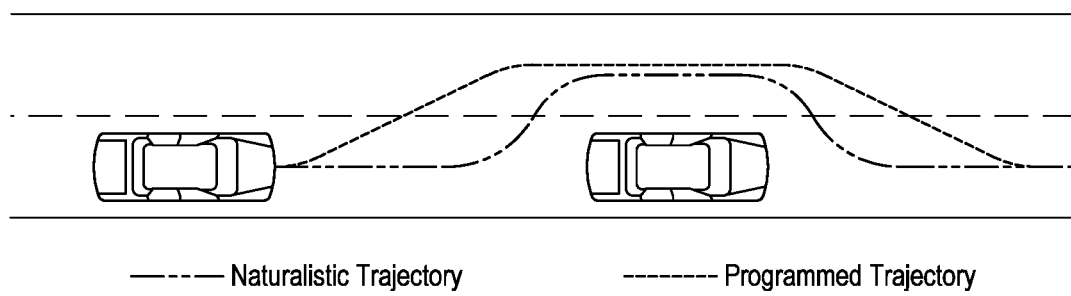
FIG. 5 depicts a naturalistic trajectory versus a programmed trajectory.

In a preferred set of variations, The 1$^{st}$ set of learning modules (equivalently referred to herein as deep decision networks (DDNs), learning agents, learned models, etc.) (e.g., as shown in FIG. 3A, as shown in FIG. 3B, as shown in FIG. 4, etc.) use the current context of the agent as well as a full representation of the environment around the agent to select an action for the vehicle to take during the current planning cycle. Vehicle actions can include, for instance, but are not limited to, any or all of: stopping behind a vehicle, yielding to a vehicle, merging onto a road, and/or any other suitable actions. A depiction of a set of actions determined for two different contexts can be seen in FIG. 10.

The actions can include, but are not limited to, any or all of: maintaining a lane, changing lanes, turning (e.g., turning right, turning left, performing a U-turn, etc.), merging, creeping, following a vehicle in front of the agent, parking in a lot, pulling over, nudging, passing a vehicle, and/or any other suitable actions such as usual driving actions for human-operated and/or autonomous vehicles.

Each action is preferably associated with a set of parameters, which are determined based on the particular context of the agent and optionally any other suitable inputs (e.g., sensor information, fixed route information, etc.). The parameter values can be any or all of: predetermined (e.g., assigned values for a particular context), dynamically determined (e.g., with the learning module and based on additional information such as an environmental representation), any combination, and/or otherwise determined. This highlights a potential benefit of this architecture, which is that it can enable various parameter values to be associated with an action, wherein the context specifies the particular value or range of values, thereby enabling the action learned for different contexts to be associated with parameter values optimal to that context. In contrast, in conventional methods where the method is entirely programmed, for instance, one would need to either generalize the parameter (e.g., creep distance) to have an overly conservative value or program multiple values for different cases; and in methods including only learning based approaches, this would lead to an oversimplification of the action across cases, which could result in unpredictable agent behavior at times (e.g., robotic behavior, the ultimate production of an infeasible trajectory, etc.).

In preferred variations, an output layer of each learning module is a softmax layer where the number of output nodes is the number of available actions. In specific examples, for instance, the softmax layer assigns a confidence to each action in the action space, wherein the action with the highest confidence is provided as an output of the learning module. Additionally or alternatively, an action space and/or available actions can be determined in any other suitable way(s).

In a specific example, a multi-lane highway context produces, with a multi-lane highway learning module, a corresponding action space including: maintaining speed, lane change left, and lane change right. In contrast, a different context such as a residential road produces actions such as those in the highway context and additional actions such as stop, yield, creep, left turn, and right turn.

In additional or alternative variations, an output layer (e.g., linear output layer) can be used to generate an embedding (e.g., a vector, a vector of real numbers, etc.) for the action, wherein the embedding could be matched to stored embeddings associated with particular actions (e.g., at a lookup table). In specific examples, for instance, a length and/or angle of an embedding vector produced by an output layer can be used to match it to a vector associated with a particular action.

Selecting an action can be performed by any or all of: the context-aware learning module, performed with another model and/or algorithm and/or process, determined based on other information (e.g., any or all of the set of inputs from S212, based on the particular route, based on a next context in the map, etc.), and/or otherwise determined.

In preferred variations, the action is produced as an output (e.g., single output, multiple outputs, etc.) of the context-aware learning agent.

In additional or alternative variations, the action can be determined based on a state machine or other rule-based method for choosing an action based on context.

Figure 10:
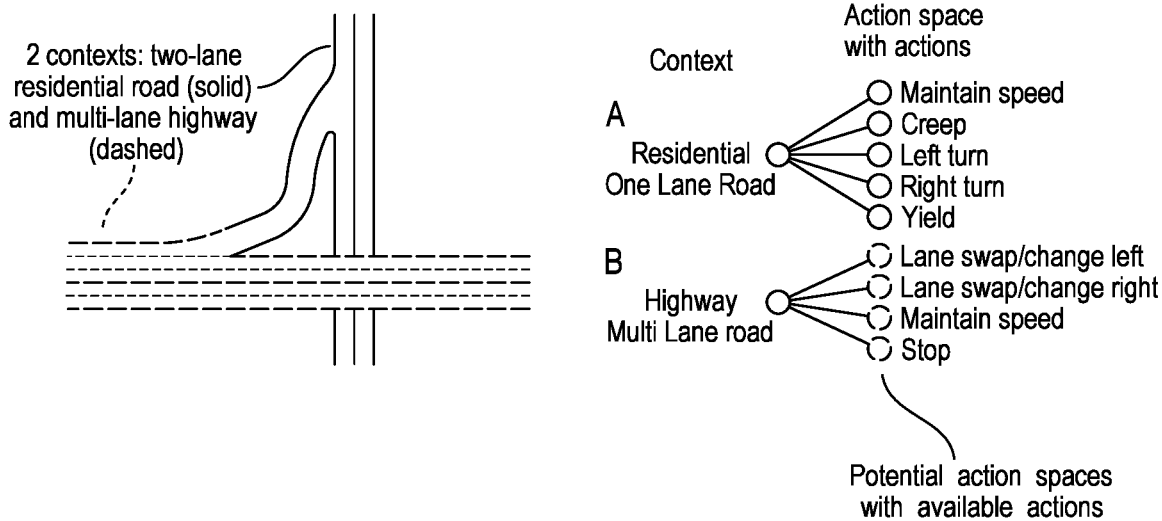
FIG. 10 depicts a variation of a set of contexts.

In a first variation, the context of the agent is determined from a map to be a one-lane residential road (e.g., in which the agent cannot change contexts due to road geometry as shown in FIG. 10). A set of actions determined for this context can include, for instance: maintaining speed, creeping, left turning, right turning, and yielding. For creeping, a major parameter is creep distance, which refers to the distance the agent should creep forward with extra caution (e.g., before deciding to merge). For instance, humans tend to creep at a stop sign or before merging on a highway to cautiously gauge any oncoming traffic and pace the speed of the vehicle to merge without collisions or annoyance to road users. Depending on the particular context and optionally action, the value of this parameter is different. In specific examples, for the context of a parking lot and the action of turning right and/or stopping at a stop sign, the creep distance is 2 meters, whereas for the context of a multi lane highway and the action of merging, the creep distance is 17 meters.

In a second variation, the context of the agent is determined to be a multi-lane highway in which the agent can learn (e.g., in the learning module) it is less likely to see pedestrians. The actions of the action space can include, for instance: lane swap left, lane swap right, maintain speed, and stop.

Additionally or alternatively, S222 can include any other suitable processes performed in any suitable way(s).

4.5 Method—Selecting a $2^{nd}$ Learning Module S214

S210 preferably includes selecting a $2^{nd}$ learning module (equivalently referred to herein as a deep trajectory network) S214, which functions to select a learning module based on the action, which preferably additionally functions to select an action-specific module with which to determine the agent's trajectory. The $2^{nd}$ learning module is preferably tuned to (e.g., trained based on, with a highly tuned loss function corresponding to) the particular action (and/or multiple actions in an action space) of the agent. In preferred variations, for instance, S214 functions to select a particular learned model (e.g., decision network) from a set of multiple learned models based on the particular action (e.g., as described above) selected for the vehicle (e.g., based on context). S214 can additionally or alternatively function to determine a trajectory of the agent, select a learning module based on other environmental information relative to the agent, select a learning module based on other information relative to the agent (e.g. historical information, object information, etc.), eliminate available options to the agent (e.g., eliminate available trajectories), and/or can perform any other suitable functions.

Selecting a $2^{nd}$ learning module is equivalently described herein as selecting one of a $2^{nd}$ set of learning modules and/or selecting one of a set of $2^{nd}$ learning modules.

S214 is preferably performed in response to (e.g., after, based on, etc.) S222 (e.g., a most recent instance of S222), wherein S222 is preferably performed in response to S212, such that the $2^{nd}$ learning module is selected based on an action which is determined based on a context of the agent. Additionally or alternatively, S214 can be performed as part of and/or combined with S212, concurrently with S212, in absence of S212, multiple times throughout the method (e.g., in response to the context changing), and/or at any other time(s) during the method 200. Further additionally or alternatively, the method 200 can be performed in absence of S214.

In some variations, S214 is automatically performed in response to S212 being performed and an action being determined and/or a trigger indicating that a context of the vehicle (e.g., as determined based on its location on a map) has changed and/or is about to change. Additionally or alternatively, S214 can be performed based on other triggers, continuously and/or at a predetermined frequency, in absence of a trigger, and/or in any other ways (e.g., as described above).

A single learning module from the $2^{nd}$ set of learning modules is preferably selected based an action selected for the vehicle in S222. Additionally or alternatively, the particular learning module can be determined and/or selected based on an action determined in any other suitable way, the selected $1^{st}$ learning module, information received in S205, and/or any other suitable information. Further additionally or alternatively, multiple learning modules from the $2^{nd}$ set of learning modules can be selected (e.g., to be processed in series, to be processed in parallel, etc.).

The $2^{nd}$ learning module is further preferably selected based on a mapping between actions and $2^{nd}$ learning modules. In preferred variations, each action is associated with a single learning module of the $2^{nd}$ set of learning modules in a 1:1 mapping (e.g., as stored in lookup table and/or database), wherein each action is only associated with a single $2^{nd}$ learning module and wherein each of the $2^{nd}$ learning modules is only associated with a single action. The mappings are preferably predetermined (e.g., programmed, rule-based, etc.), but can additionally or alternatively be dynamically determined. Additionally or alternatively, a single action can be associated with multiple $2^{nd}$ learning modules, wherein one of the set of $2^{nd}$ learning modules is selected (e.g., further based on the set of inputs) and/or the module outputs are aggregated; a module can be associated with multiple contexts; and/or any other association can be established between actions and learning modules.

Additionally or alternatively, the $2^{nd}$ learning module can be selected based on other information (e.g., to further narrow down the selection of a learning module). In some variations, for instance, each (context, action) pair is associated with a single $2^{nd}$ learning module.

The $2^{nd}$ learning module (equivalently referred to herein as an action-aware learning agent, a deep trajectory network [DTN], etc.) is preferably in the form of and/or includes a machine learning model, further preferably in the form of one or more neural networks (e.g., deep Q-learning network, convolutional neural network [CNN], etc.) trained for a particular action and/or actions, but can additionally or alternatively include any other suitable models, algorithms, decision trees, lookup tables, and/or other tools. The deep trajectory networks (DTN) are preferably selected based on the action selected by the deep decision network (DDN) and preferably function to generate highly optimized safe trajectories with action-driven safety constraints during the current planning cycle.

The $2^{nd}$ set of learning modules are preferably selected, optimized, and safely constrained based on a specific action (e.g., as described above). In specific examples, each of the $2^{nd}$ set of learning modules uses a localized view around the vehicle (e.g., including information associated with only the proximal dynamic and static objects, including information associated with only proximal road features, etc.) to ultimately plan a safe, effective and naturalistic trajectory which the vehicle should follow (e.g., as described in S224). This data-driven modular approach leads to deterministic models which need exponentially less data compared to other conventional architectures.

In preferred variations, each of the $2^{nd}$ set of learning modules is a deep neural network (DNN) (e.g., neural network), further preferably a deep Q-learning network trained using Inverse Reinforcement learning, wherein the number of layers (e.g., hidden layers) of the neural network can vary for different actions (e.g., between 3-8 layers, 3 or less layers, 8 or more layers, between 2 and 10 layers, between 1 and 15 layers, etc.) and/or based on any other information. Additionally or alternatively, any other suitable networks, algorithms, and/or models can be used in the learning module(s), such as any or all of those described above. Each of the set of multiple $2^{nd}$ learning modules is preferably the same type of neural network (e.g., with different numbers of layers) and/or algorithm and/or model, but can alternatively be different (e.g., have different architectures, different neural network types, etc.). In a set of specific examples, the $2^{nd}$ learning modules has the same architecture as the $1^{st}$ set of learning modules. In alternatively examples, the $1^{st}$ set and $2^{nd}$ set of learning modules have different architectures.

Each of the $2^{nd}$ learning modules is preferably trained based on data occurring within the particular action type associated with the $2^{nd}$ learning module and optionally additionally based on data occurring within any or all of: a route (e.g., fixed route) being traveled by the vehicle, the context of the vehicle, and/or any other suitable information. In some variations, for instance, a single $2^{nd}$ learning module applies to a particular action type, wherein the single $2^{nd}$ learning module is trained based on data wherein the vehicle is performing the action. Additionally or alternatively, the single $2^{nd}$ learning module is trained based on data associated with the context selected prior in S212. Additionally or alternatively, the $2^{nd}$ learning module(s) can be trained with any suitable data.

Each of the $2^{nd}$ learning modules is further preferably trained with inverse reinforcement learning, which functions to determine a reward function and/or an optimal driving policy for each of the context-aware learning modules. The output of this training is further preferably a compact fully-connected network model that represents the reward function and an optimal policy for each learning module. Additionally or alternatively, the learning modules can be otherwise suitably trained (e.g., with reinforcement learning, supervised learning, semi-supervised learning, unsupervised learning, etc.) and/or implemented.

In a first variation, S214 includes selecting a $2^{nd}$ learning module (equivalently referred to herein as an action-aware learning module) based on a determined action of the agent. In specific examples, a single action-aware learning module is assigned to each action. The action-aware learning module is preferably trained with an inverse reinforcement learning model, but can additionally or alternatively be otherwise trained.

In a second variation, S214 includes selecting a $2^{nd}$ learning module (equivalently referred to herein as an action-aware learning module) based on a determined action of the agent along with the context that led to the action. In specific examples, a single action-aware learning module is assigned to each (context, action) pair.

In a third variation, S214 includes selecting from multiple action-aware learning modules assigned to/available to a particular action, wherein the particular action-aware learning module is selected based on any or all of: machine learning, a decision tree, statistical methods, an algorithm, and/or with any other suitable tool(s).

Additionally or alternatively, any other suitable learning modules can be selected, used, and/or trained.

4.6 Method—Generating a Vehicle Trajectory S224

The method preferably includes generating a vehicle trajectory S224, which functions to generate a trajectory for the agent to follow to perform the selected action. Additionally or alternatively, S214 can function to generate a most optimal trajectory for the agent (e.g., by eliminating trajectories from consideration based on the action), reduce a time and/or processing required to generate a trajectory, and/or perform any other suitable functions.

S224 is preferably performed in response to (e.g., after, based on, etc.) S214, but can additionally or alternatively be performed in response to S210 and/or S212, as part of S214 and/or concurrently with S214, in absence of S212 and/or S214, in response to S205, multiple times throughout the method, and/or at any other time(s) during the method 200. Further additionally or alternatively, the method 200 can be performed in absence of S224.

S224 is preferably performed with a selected $2^{nd}$ learning module as described above, wherein the trajectory is produced as an output of the $2^{nd}$ learning module and/or determined based on an output of the $2^{nd}$ learning module, but can additionally or alternatively be performed with a $1^{st}$ learning module, a combined $1^{st}$ and $2^{nd}$ learning module, multiple learning modules, any deep learning process, any programmed process, and/or any other suitable processes.

S224 preferably includes determining (e.g., calculating) a safety tunnel and a set of safety tunnel constraints associated with the agent, which defines a constrained driving region for the autonomous agent based on the selected action. The safety tunnel is preferably determined based on the selected action and functions to constrain the set of all available trajectories to the agent by sharpening the environment for where the future trajectory can be. In some variations, for instance, this functions to limit the environment to only the environment relevant to the selected action and where the vehicle might be in the future based on the selected action. The safety tunnel is further preferably calculated based on a set of inputs including a location of the agent as well as map information such as: road boundaries, location of stop signs, location of traffic lights, but can additionally or alternatively take into account any other suitable inputs. Additionally or alternatively, the safety tunnel can be calculated based on any other suitable information.

The safety tunnel is preferably a region defined relative to a fixed point, plane, and/or surface of the autonomous agent (e.g., front wheel, outermost surface of front bumper, etc.) and/or associated with the autonomous agent (e.g., a virtual point and/or plane and/or surface relative to and moving with the autonomous agent) and which extends to any or all of: a predetermined distance (e.g., 100 meters, between 50 meters and 100 meters, less than 50 meters, between 100 and 150 meters, 150 meters, between 150 meters and 200 meters, greater than 200 meters, etc.), a planning horizon, a stopping object (e.g., yielding sign, stop sign, traffic light, etc.) at which the vehicle must stop, and/or any other suitable information. The parameters of the safety tunnel are preferably determined based on the action, such as, but not limited to, any or all of: predetermined assignments, dynamically determined assignments, an output of the $1^{st}$ learning module, and/or based on any other information. The safety tunnel is preferably calculated at each planning cycle (e.g., running 30 times per second, running 10 times per second, running 50 times per second, running between 0 and 60 times per second, running greater than 60 times per second, etc.), but can additionally or alternatively be calculated at any or all of: continuously, at a predetermined frequency, at a set of intervals (e.g., random intervals), in response to a trigger, and/or at any other suitable times. The safety tunnel functions to represent all possible locations that the agent can occupy for the current selected action. The safety tunnel is preferably constrained by the current lane of the agent unless the action identifies a change lane action, but can additionally or alternatively be otherwise constrained.

In a specific example where the agent is stopped at a stop sign and where the possible actions are to continue yielding for other traffic or to merge onto the lane, if the action is to continue yielding for vehicles, the safety tunnel would only extend to the stop sign and not beyond, limiting the movement of the agent (equivalently referred to herein as an ego vehicle). If the action switches to merge onto the lane, the safety tunnel is programmatically switched to encapsulate the full space of the lane the agent is meant to merge into.

In another specific example, another vehicle that is 100 meters behind the ego vehicle on a neighboring lane is not relevant (e.g., outside the safety tunnel) if the current action is to keep driving straight in the current lane. This, however, becomes relevant (e.g., in the safety tunnel) if the action is instead to perform a lane change action.

Additionally or alternatively, the safety tunnel can be otherwise designed and/or implemented; the method can be performed in absence of the safety tunnel; and/or the method can be otherwise performed.

The safety tunnel can optionally be used to select which static and dynamic objects are within the safety tunnel, wherein only those objects are used for consideration and/or further processing (e.g., in determining the localized environmental representation, in determining a latent space representation, etc.). In some variations, for instance, localized dynamic and static object selectors (e.g., in the computing system) select the relevant surrounding objects based on the action output from the $1^{st}$ learning module, its associated safety tunnel, as well as any information about these objects such as their location, distance from the ego vehicle, speed, and direction of travel (e.g., to determine if they will eventually enter the safety tunnel). Additionally or alternatively, relevant static and dynamic objects can be determined in absence of and/or independently from a safety tunnel (e.g., just based on the selected action, based on a predetermined set of action constraints, etc.), all static and dynamic objects can be considered, and/or S224 can be otherwise suitably performed.

In a first set of variations of the safety tunnel, the safety tunnel is used as a constraint in trajectory generation, wherein the safety tunnel sharpens (e.g., localizes based on action, constrains based on action, etc.) the environment of the vehicle by incorporating planning information such as a future horizon planning lookahead. In specific examples, the safety tunnel is used in part to generate a latent space representation used in the final trajectory generation.

S224 preferably includes receiving a set of inputs, such as any or all of those described above, in S205, in S222, and/or any other suitable inputs.

The set of inputs can include any or all of the inputs described above; additional inputs; different inputs; and/or any suitable set or combination of inputs. In preferred variations, the set of inputs received in S224 includes any or all of: dynamic object information (e.g., within the safety tunnel) and their predicted paths; static object information (e.g., within the safety tunnel); one or more uncertainty estimates (e.g., calculated throughout the method, calculated at every $1^{st}$ learning module, calculated at every $2^{nd}$ learning module, etc.); a map and/or inputs from the map; the state of and/or dynamic information associated with the agent; and/or any other suitable information.

The set of inputs are preferably used to determine a localized environmental representation, which takes into account the information collected to determine an environmental representation (e.g., as described previously), along with action-based constraints (e.g., based on parameters from the safety tunnel and/or the safety tunnel constraints such as a more limited field of view), thereby producing a more targeted, relevant, and localized environmental representation for the agent based on the action selected, which is equivalently referred to herein as a localized environmental representation. This can function, for instance, to reduce the amount of information that needs to be considered by and/or processed by the $2^{nd}$ learning module (e.g., for faster processing). Additionally or alternatively, the same environmental representation as described previously, the localized environmental representation can include other information and/or be otherwise constrained, and/or the localized environmental representation can be otherwise formed.

Determining the localized environmental representation can optionally include determining a latent space representation. The latent space representation is preferably determined with the same processes and/or a similar process for determining the latent space representation as described above, but can additionally or alternatively include any other suitable latent space representation and/or process for determining a latent space representation. Further additionally or alternatively, S214 can be performed in absence of a latent space representation.

In a preferred set of variations, the safety tunnel constraints and localized dynamic and static objects, the routing information required to reach the destination, and the current agent state, are passed to a latent space representation, which reduces the overall size of the environmental representation. This latent space representation is then used by the set of deep trajectory networks, which are optimized and selected based on a single action to create the final trajectory that is proposed for the agent to follow. Additionally or alternatively, these inputs can be received at the deep trajectory networks in absence of the latent space representation. In specific examples, using a single deep trajectory network for each action of the agent allows each network to be hyper-tuned and optimized in terms of loss function to correctly output an optimal trajectory for each situation.

The method 200 can optionally include training any or all of the $2^{nd}$ set of learning modules. The learning modules are preferably trained at a remote computing system of the system 100, but can additionally or alternatively be trained at any suitable location(s). The $2^{nd}$ set of learning modules can be trained separately/independently from the $1^{st}$ set of learning modules and with different sets of inputs and outputs, or can additionally or alternatively be trained together (e.g., based on the same processes, based on the same data, etc.). The $2^{nd}$ set of learning modules are preferably trained with the same training processes as described above, but can additionally or alternatively be trained with any suitable processes.

In a first variation of training, for instance, each of the $2^{nd}$ learning modules uses the action from the training data to programmatically build action-based constraints. These constraints are used to build the localized environmental representation around the safety tunnel which is used as an input to the network, wherein the DTN is trained on the trajectory from the training data. While preferably trained on a different set of inputs and outputs than the $1^{st}$ set of learning modules, each of the $2^{nd}$ set of learning modules is preferably trained with the $1^{st}$ and $2^{nd}$ training phases as described above. In specific examples, for instance, the weights of the loss function take into account the particular action and what needs to be optimized for it based on the defined safety tunnel. Additionally or alternatively, the $2^{nd}$ set of learning modules can be otherwise trained.

Additionally or alternatively, the $2^{nd}$ learning modules can be otherwise configured and/or trained.

In a first set of variations, S224 includes determining a trajectory for the agent with a $2^{nd}$ learning module selected from a set of multiple $2^{nd}$ learning modules in S214, wherein the $2^{nd}$ learning module receives a localized environmental representation as input, wherein the localized environmental representation is determined based on action-specific-based constraints along with a safety tunnel.

In a second set of variations, S224 includes determining an intermediate output from a $2^{nd}$ learning module, wherein the intermediate output is used to determine a trajectory.

Additionally or alternatively, S224 can include any other suitable processes and/or be otherwise performed.

4.7 Method—Validating the Vehicle Trajectory S260

The method 200 can optionally include validating the vehicle trajectory S260, which functions to ensure that the trajectory is safe and effective (e.g., in reaching the destination) for the agent.

S260 is preferably performed in response to (e.g., after, based on, etc.) S224, but can additionally or alternatively be performed in response to any other suitable process, as part of S224 and/or concurrently with S224, multiple times throughout the method, and/or at any other time(s) during the method 200. Further additionally or alternatively, the method 200 can be performed in absence of S260.

The trajectory is preferably validated based on a programmed set of rules, which can include any or all of: checking for collisions that would or may occur with static and/or dynamic objects (e.g., with a likelihood and/or confidence above a predetermined threshold, with a likelihood and/or confidence above 10%, with a likelihood and/or confidence between 5% and 100%, with a likelihood and/or confidence of 5% or below, with a likelihood and/or confidence between 10% and 30%, with a likelihood and/or confidence between 30% and 50%, with a likelihood and/or confidence between 50% and 70%, with a likelihood and/or confidence between 70% and 90%, with a likelihood and/or confidence of at least 90%, etc.); checking if the trajectory follows the rules of the road (e.g., traffic laws, best practices, road infrastructure, etc.); and/or checking for any other suitable rules. In an event that the generated trajectory is found to violate one or more rules (e.g., single rule, all rule, etc.) and/or an uncertainty associated with the trajectory (e.g., uncertainty associated with the determination of the trajectory, uncertainty associated with inputs used to determine the trajectory such as a probability of input data being out-of-distribution, both, etc.) exceeds a threshold, a backup programmed trajectory (e.g., from a fallback motion planner) can be implemented and/or any other suitable fallback can be implemented.

In preferred variations, for instance, the set of rules includes a first set of one or more rules which check for collisions with static or dynamic objects that would and/or may occur with the generated trajectory and a second set of one or more rules which check if the trajectory follows the rules of the road.

Additionally or alternatively, validating the trajectory can optionally include checking to see if the agent stays within the safety tunnel used to determine the trajectory. Additionally or alternatively, validating the trajectory can include any other rules.

Further additionally or alternatively, S260 can include any other suitable processes, S260 can include one or more learned processes, the method 200 can be performed in absence of S260, and/or S260 can be otherwise suitably performed.

In an event that the generated trajectory does not satisfy one or more of these rules, the method 200 preferably includes implementing a backup programmed trajectory and/or otherwise implementing a fail-safe mechanism (e.g., triggering a fallback trajectory planner, repeating S224, pulling the vehicle over to the side of the road, stopping the vehicle, etc.). Additionally or alternatively, the method 200 can trigger any other suitable process.

The method 200 can optionally include operating the vehicle according to the validated vehicle trajectory. Additionally or alternatively, the method 200 can include operating the vehicle according the trajectory generated in S214, determining a set of control commands based on the trajectory and/or the validated trajectory, operating the vehicle based on the set of control commands, and/or any other suitable processes.

5. Variations

In a first set of variations, the method 200 includes: receiving a set of inputs including any or all of: agent state and/or dynamic information; static object information; dynamic object information (e.g., past trajectory, predicted trajectory, etc.); sensor information; and/or any other suitable information; receiving and/or determining a context for the vehicle, the context determined based on a location parameter (e.g., pose) of the agent and a map; selecting a $1^{st}$ learning module based on the context and with a mapping (e.g., a 1:1 mapping); determining an action for the vehicle with the $1^{st}$ learning module, wherein the $1^{st}$ learning module receives an environmental representation as input, the environmental representation determined based on the set of inputs; selecting a $2^{nd}$ learning module based on the action and with a mapping (e.g., a 1:1 mapping); determining a vehicle trajectory with the $2^{nd}$ learning module, wherein the $2^{nd}$ learning module receives as input a localized environmental representation; validating the vehicle trajectory based on a set of rules and/or based on a set of one or more uncertainties associated with the trajectory; in an event that the vehicle trajectory is not validated (e.g., based on the set of rules, based on uncertainty estimates, etc.), defaulting to a fallback mechanism and/or fallback motion planner; and in an event that the trajectory is validated, operating the vehicle based on the validated trajectory. Additionally or alternatively, the method 200 can include determining one or more latent space representations, determining (e.g., defining) a safety tunnel, training any or all of the learning modules, and/or any other processes performed in any suitable order.

In a set of specific examples, the method 200 includes: receiving a set of inputs, wherein the set of inputs includes a high definition, labeled (e.g., hand-labeled, automatically-labeled, etc.) map which prescribes the context of the autonomous agent at any given time based on its location and/or orientation (e.g., pose) within the map, a set of detected dynamic objects and associated information (e.g., current position, size, previous path, and predicted path into the future), a set of all static objects and their current states, routing information required to reach the destination, the current ego state, and/or any other suitable information; determining a latent space representation based on the set of input and determining a full environmental representation based on the latent space representation; selecting a first learning module based on the context of the agent, wherein the selected $1^{st}$ learning module is determined based on a 1:1 mapping from the context to $1^{st}$ learning module, and wherein the $1^{st}$ learning module includes a deep Q-learning network trained based on an inverse reinforcement learning algorithm; selecting an action for the agent with the $1^{st}$ learning module and the full environmental representation; defining a safety tunnel based on the selected action; determining a latent space representation with the set of inputs and the safety tunnel and determining a localized environmental representation based on the latent space representation; selecting a $2^{nd}$ learning module based on the action, wherein the selected $2^{nd}$ learning module is determined based on a 1:1 mapping from the action to the $2^{nd}$ learning module (e.g., in light of the context) and wherein the $2^{nd}$ learning module includes a deep Q-learning network trained with an inverse reinforcement learning algorithm; generating a trajectory for the autonomous agent with the $2^{nd}$ learning module and the localized environmental representation; validating the trajectory with a set of rules; and if the trajectory is validated, operating the vehicle based on the trajectory. Additionally or alternatively, the method 200 can include any other processes and/or combination of processes.

In a second set of variations, the method 200 includes: receiving a set of inputs including any or all of: agent state and/or dynamic information; static object information; dynamic object information (e.g., past trajectory, predicted trajectory, etc.); sensor information; and/or any other suitable information; receiving and/or determining a context for the vehicle, the context determined based on a location parameter (e.g., pose) of the agent and a map; selecting a $1^{st}$ learning module based on the context and with a mapping (e.g., a 1:1 mapping); determining a vehicle trajectory with the $1^{st}$ learning module, wherein the $2^{nd}$ learning module receives as input an environmental representation; validating the vehicle trajectory based on a set of rules; in an event that the vehicle trajectory is not validated (e.g., based on the set of rules, based on uncertainty estimates, etc.), defaulting to a fallback mechanism and/or fallback motion planner; and in an event that the trajectory is validated, operating the vehicle based on the validated trajectory. Additionally or alternatively, any number of learning modules can be implemented to generate the trajectory.

In a third set of variations, the method 200 includes: receiving a set of inputs including any or all of: agent state and/or dynamic information; static object information; dynamic object information (e.g., past trajectory, predicted trajectory, etc.); sensor information; and/or any other suitable information; receiving and/or determining a context for the vehicle, the context determined based on a location parameter (e.g., pose) of the agent and a map; selecting a $1^{st}$ learning module based on the context and with a learned model and/or algorithm and/or decision tree and/or mapping; determining an action for the vehicle with the $1^{st}$ learning module, wherein the $1^{st}$ learning module receives an environmental representation as input, the environmental representation determined based on the set of inputs; selecting a $2^{nd}$ learning module based on the action and with a learned model and/or algorithm and/or decision tree and/or mapping; determining a vehicle trajectory with the $2^{nd}$ learning module, wherein the $2^{nd}$ learning module receives as input a localized environmental representation; validating the vehicle trajectory based on a set of rules; in an event that the vehicle trajectory is not validated (e.g., based on the set of rules, based on uncertainty estimates, etc.), defaulting to a fallback mechanism and/or fallback motion planner; and in an event that the trajectory is validated, operating the vehicle based on the validated trajectory. Additionally or alternatively, the method 200 can include determining one or more latent space representations, determining a safety tunnel, training any or all of the learning modules, and/or any other processes performed in any suitable order.

Additionally or alternatively, the method 200 can include any other suitable processes performed in any suitable order.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for operating an autonomous agent, the method comprising:
    receiving a set of inputs;
    selecting a first learned model from a first set of learned models based on the set of inputs;
    selecting a second learned model from a second set of learned models based on an output of the first learned model;
    determining a trajectory for the autonomous agent based on the second learned model; and
    operating the autonomous agent based on the trajectory.

2. The method of claim 1, further comprising validating the trajectory.

3. The method of claim 2, wherein the trajectory is validated based on at least one of: an uncertainty associated with the trajectory and a satisfaction of a set of predetermined rules.

4. The method of claim 1, wherein the set of inputs comprises a set of sensor inputs collected from a sensor system onboard the autonomous agent.

5. The method of claim 4, wherein the set of inputs further comprises a context of the autonomous agent.

6. The method of claim 5, further comprising determining the context based on a map.

7. The method of claim 6, wherein the map prescribes a set of multiple contexts, wherein the context is selected from the set of multiple contexts.

8. The method of claim 5, wherein the context is at least partially determined based on a fixed route associated with the autonomous agent.

9. The method of claim 1, wherein the output comprises an action of the autonomous agent.

10. The method of claim 1, wherein at least one of the first learned model and the second learned model is selected based on a set of mappings.

11. The method of claim 1, wherein the first and second set of learned models comprise neural networks, wherein the neural networks are trained with at least one of: inverse reinforcement learning and reinforcement learning.

12. A system for operating an autonomous agent, the system comprising:
    a sensor system;
    a first set of learned models;
    a second set of learned models; and
    a computing system, wherein the computing system:
        receives a set of inputs, wherein at least a portion of the set of inputs is received from the sensor system;
        determines a first learned model based on the set of inputs and a first set of learned models;
        determines a second learned model based on an output of the first learned model and a second set of learned models;
        determines a trajectory for the autonomous agent based on the second learned model; and
        operates the autonomous agent based on the trajectory.

13. The system of claim 12, wherein the sensor system comprises a location sensor and an orientation sensor, and wherein the set of inputs comprises a set of poses associated with the autonomous agent.

14. The system of claim 12, wherein the set of inputs comprises a context associated with the autonomous agent.

15. The system of claim 14, further comprising a map, wherein the context is determined based on the map.

16. The system of claim 15, wherein the map comprises a set of labeled contexts, wherein the context is selected from the set of labeled contexts based on a location of the autonomous agent.

17. The system of claim 14, wherein the context is determined based on a fixed route associated with the autonomous agent.

18. The system of claim 12, wherein the computing system further validates the trajectory based on at least one of: an uncertainty associated with the trajectory and a satisfaction of a set of predetermined rules.

19. The system of claim 12, wherein the output comprises an action of the autonomous agent.

20. The system of claim 12, wherein each of the first and second learned models comprises a neural network, wherein the neural network is trained with inverse reinforcement learning.

* * * * *